United States Patent [19]

Erlichman

[11] 4,262,301
[45] Apr. 14, 1981

[54] ELECTRONIC IMAGING CAMERA

[75] Inventor: Irving Erlichman, Wayland, Mass.

[73] Assignee: Polaroid Corporation, Cambridge, Mass.

[21] Appl. No.: 86,656

[22] Filed: Oct. 22, 1979

Related U.S. Application Data

[63] Continuation of Ser. No. 891,705, Mar. 30, 1978, abandoned.

[51] Int. Cl.[3] .......................... H04N 9/02; H04N 5/79
[52] U.S. Cl. ......................................... 358/6; 358/76;
358/78; 358/127; 358/130; 358/134; 358/303;
360/9; 360/35
[58] Field of Search .................... 358/4, 6, 76, 78, 127,
358/130, 229, 254, 296, 302, 303; 360/9, 10, 33, 35

[56] References Cited

U.S. PATENT DOCUMENTS

| | | | |
|---|---|---|---|
| 1,998,231 | 4/1935 | Gettinger | 358/130 |
| 2,291,476 | 7/1942 | Kernkamp | 358/300 |
| 3,347,981 | 10/1967 | Kagan et al. | 358/260 |
| 3,422,218 | 1/1969 | Byer | 358/300 |
| 3,584,143 | 6/1971 | Gold | 358/260 |
| 3,786,182 | 1/1974 | Kaneko et al. | 358/244 |
| 3,833,758 | 9/1974 | Ferrari | 358/127 |
| 3,864,514 | 2/1975 | Lemelson | 358/256 |
| 3,938,164 | 2/1976 | Ohnishi et al. | 346/110 R |
| 3,950,608 | 4/1976 | Noda et al. | 358/256 |
| 3,962,725 | 6/1976 | Lemke et al. | 360/33 X |
| 3,982,274 | 9/1976 | Chai | 358/41 |
| 4,007,488 | 2/1976 | Morishita | 358/29 |
| 4,008,372 | 12/1977 | Ueno et al. | 358/229 X |
| 4,013,876 | 3/1977 | Austin | 364/419 |
| 4,057,830 | 11/1977 | Adcock | 358/127 |
| 4,074,324 | 2/1978 | Barrett | 358/296 |
| 4,130,834 | 12/1978 | Mender et al. | 358/127 |

Primary Examiner—Bernard Konick
Assistant Examiner—Donald McElheny, Jr.
Attorney, Agent, or Firm—John S. Vale

[57] ABSTRACT

A hand held, self-processing, electronic imaging camera for electronically recording an image of a scene, for providing a visual display of the recorded image on an electro-optical display device forming part of the camera such that the operator may audit or preview the recorded image and for printing out a hard copy print of the recorded image on a non-photosensitive image receiving sheet.

13 Claims, 18 Drawing Figures

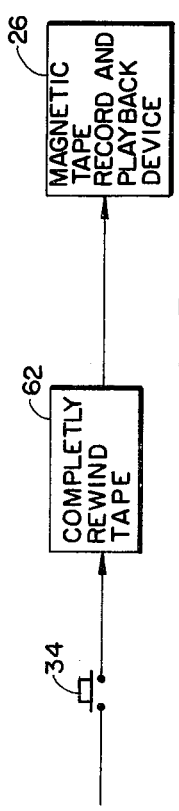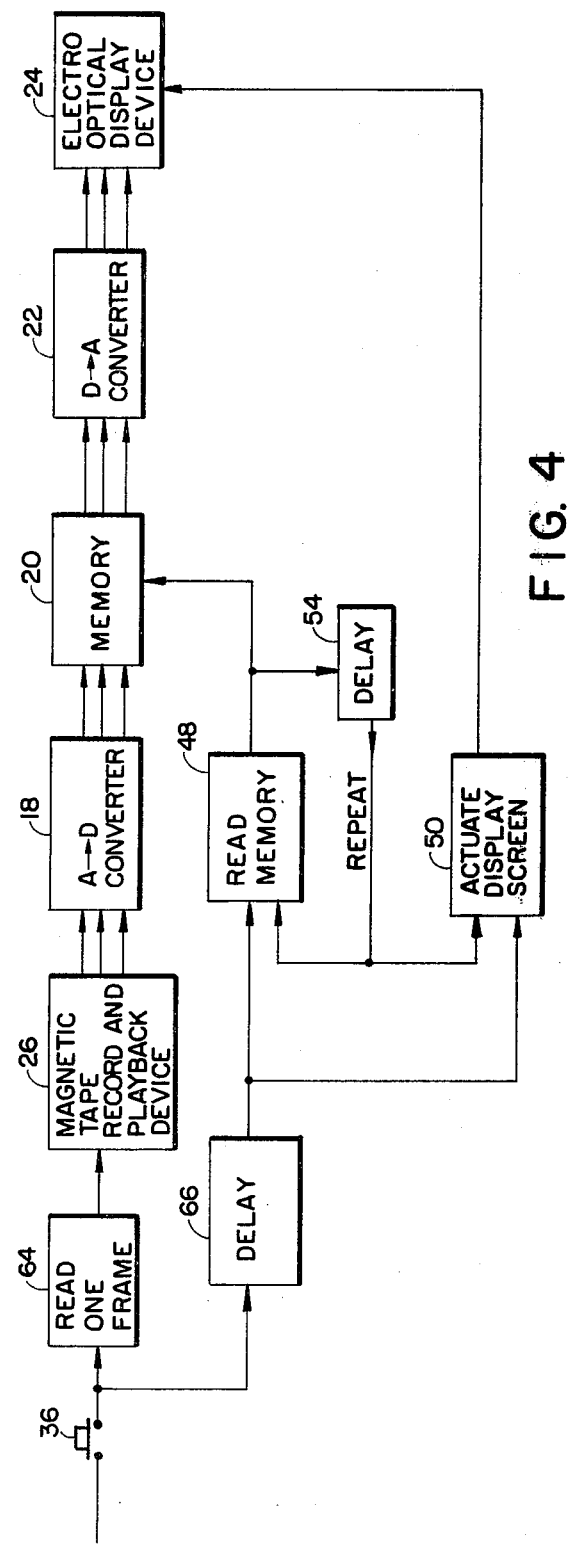

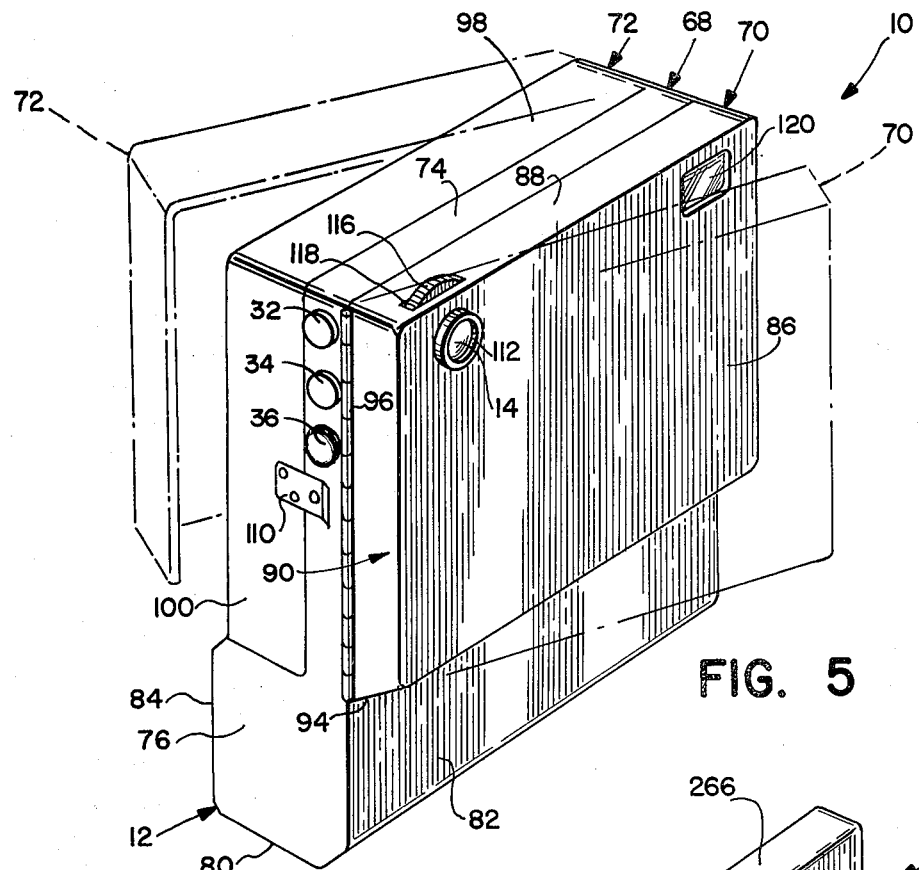
FIG. 5
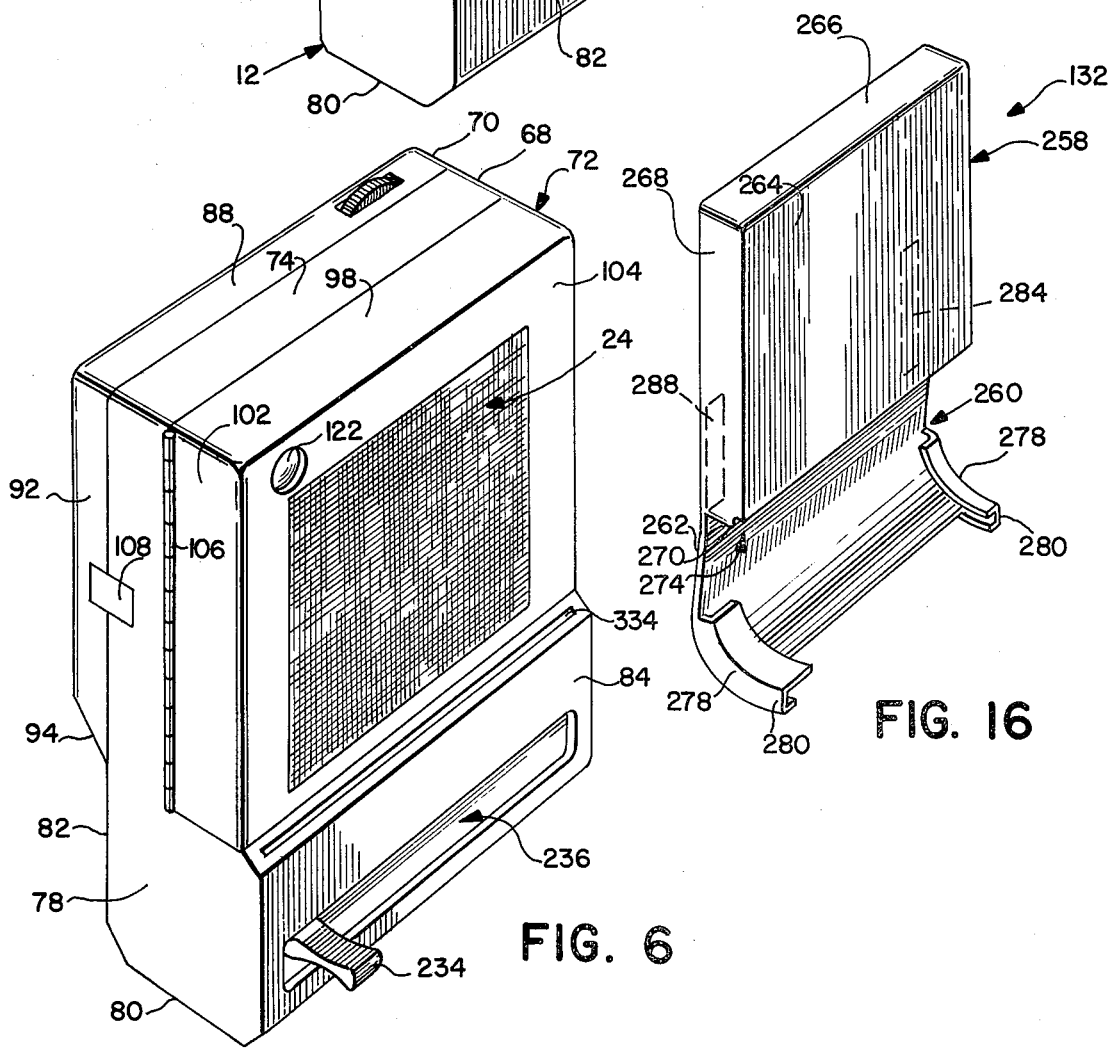
FIG. 6
FIG. 16

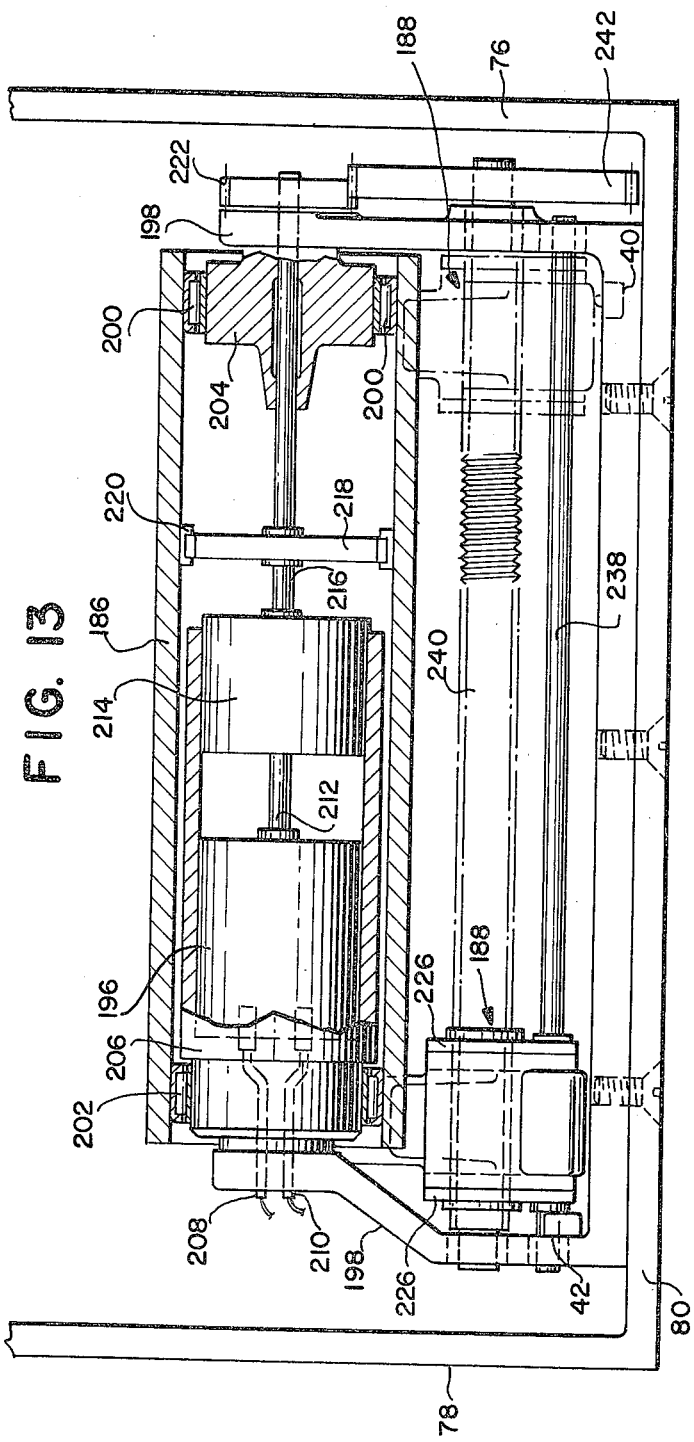
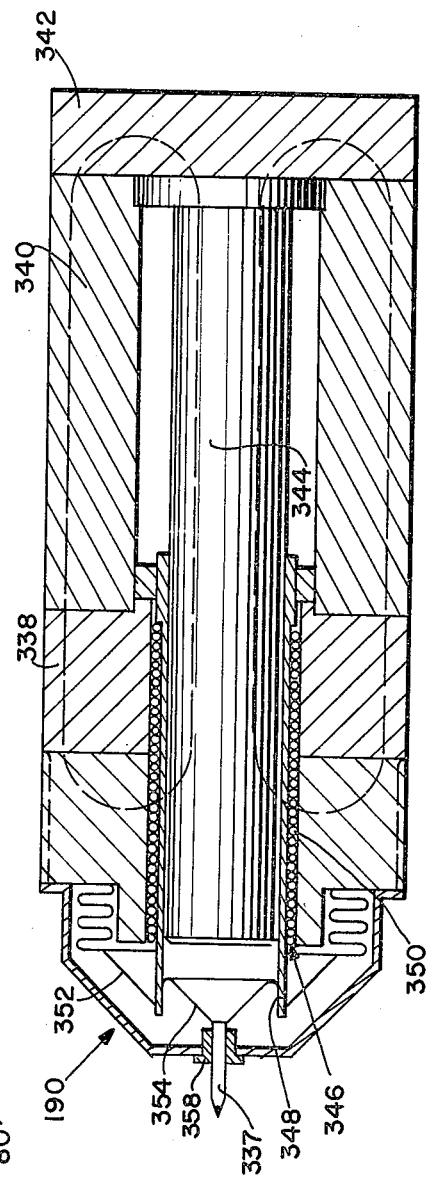

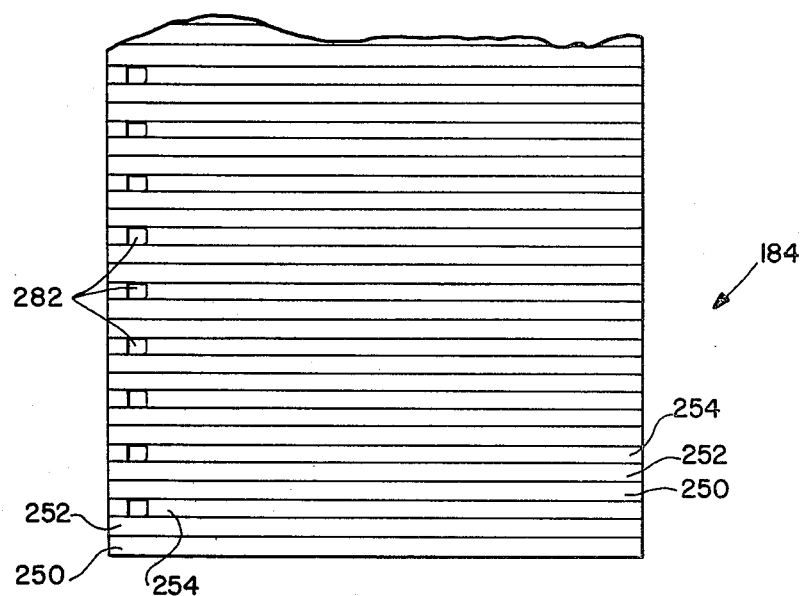
FIG. 14
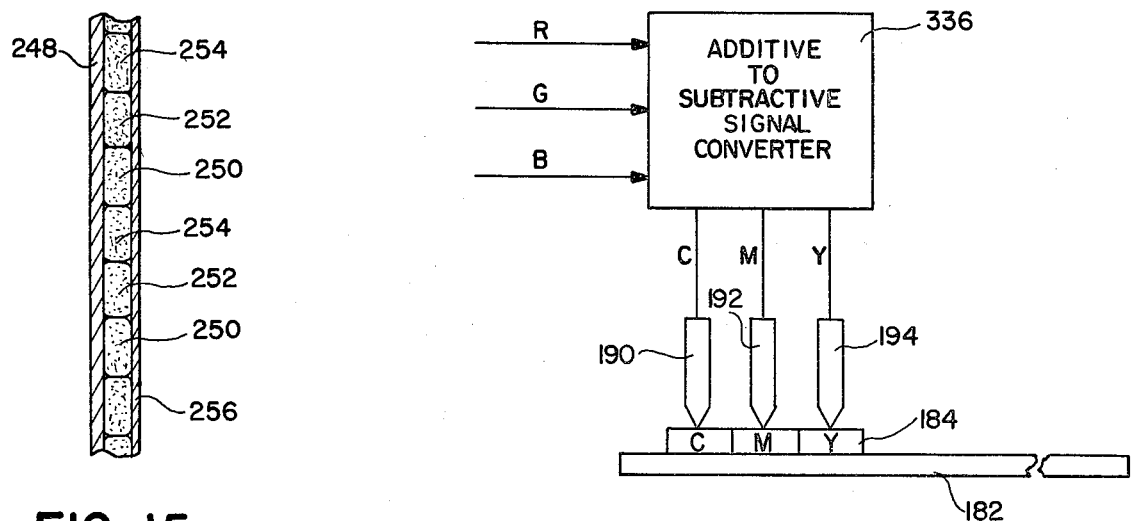
FIG. 15
FIG. 17

ELECTRONIC IMAGING CAMERA

This is a continuation of application Ser. No. 891,705 filed Mar. 30, 1978, now abandoned.

BACKGROUND OF THE INVENTION

1. Field of the Invention

The present invention relates to the field of image recording and reproduction and, more particularly, to a self-processing electronic imaging camera.

2. Description of the Prior Art

Self-processing or self-developing photographic systems are well known in the prior art. Over the years, these systems have been continuously developed—from the early systems which used peel-apart film units that provided sepia tone prints to the present day systems that feature highly automated cameras and non-peel-apart integral type film units which allow the user to watch a full color photograph develop before his eyes.

One major advantage of a self-developing photographic system over the more conventional systems wherein the exposed film must be sent to a processing laboratory for developing and printing is that the user is able to audit his results soon after exposing the film. Often times if he is not satisfied with his results because of the commission of any one of a number of common mistakes, including improper focusing, poor composition or not being close enough to subject, he may retake the photograph.

Unfortunately, as in any photographic system wherein an optical image of a scene is focused on a photosensitive film unit to form a latent image which is subsequently rendered visible by chemical development, the ability to audit photographic results is accompanied by the cost of an expended film unit which tends to be relatively expensive because of its silver content and the complexity of its manufacture.

The present invention provides a hand-held self-processing camera based on principles that represent a significant technological departure from the traditional photographic process and provides the user the opportunity to audit or view the image that he has recorded without having to produce a hard copy print of the image.

Rather than focusing an optical image of a scene on a photosensitive film unit to form a latent image which is rendered visible by chemical development, the camera embodying the present invention is configured to convert the optical image in electronic image signals that represent the optical image in electronic data form and to store these signals in signal receiving and storing means. The signal receiving and storing means preferably includes a memory which is operative to apply the image signals to an electro-optical display device on which the image is displayed so that the user may audit his results and a magnetic recording and playback device having a magnetic recording medium such as a magnetic tape on which the image signals are recorded, simultaneously with the image display on the display device, and which is selectively operative by the user to apply the recorded image signals to a printer which prints a hard copy print of the image, preferably in color, on a non-photosensitive image recording sheet. Provisions are made for recording a plurality of images in the form of electronic image signals on the magnetic tape for later use including displaying the image on the electro-optical display device and making additional prints.

While the present invention is termed a self-processing camera and functions as such, the most relevant prior art is found not in the field of photography but rather in those fields of electronics relating to image recording and reproduction including television and facsimile.

U.S. Pat. No. 4,057,830 issued on Nov. 8, 1977 to Willis A. Adcock and entitled "Electronic Photography System" is relevant in that it discloses a hand held electronic imaging camera that converts an optical image of a scene into three primary color electronic image signals and records these signals on a magnetic tape. However, the camera does not include any device for displaying the recorded image so the user may audit his results or for providing a hard copy print of the recorded image. It is intended that the magnetic tape be transferred from the camera to a separate playback unit which feeds the image signals to a color television receiver for display.

U.S. Pat. No. 3,950,608 issued on Apr. 13, 1976 to Katsuhiko Noda and entitled "Electronic Engraving and Recording System" is relevant in that it discloses a system for converting an optical image of a scene into electronic image signals, storing the image signals in a memory, displaying the image on a television monitor with signals provided from the memory and using the signals from the memory to drive or modulate an engraving unit that is effective, by selectively cutting into a multi-color two-layer plastic card, to render a visual facsimile of the recorded image. However, the disclosed system is not embodied as a portable hand-held device, but rather is depicted as a relatively large assemblage of interconnected individual components suitable for use at a fixed location. Also, the system does not include provisions for storing a plurality of recorded images which may be recalled at a later time for display or making additional hard copies.

SUMMARY OF THE INVENTION

The present invention provides a hand-held, self-processing electronic imaging camera for electronically recording an image of a scene, for providing a visual display of the recorded image on an electro-optical display device forming part of the camera and for rendering a hard copy print of the recorded image on a non-photosensitive image recording sheet.

The camera includes a camera housing of a size adapted to be held in the hand of an operator; structure within the housing for receiving a source of electrical energy such as an electrical battery; a chamber within the housing for receiving at least one sheet of an image receiving material; an optical system including a viewing device for viewing and framing a scene to be recorded and an objective lens for providing a focused optical image of the scene to be recorded; an electrically energizable photosensitive transducer on which the optical image of the scene is focused by the objective lens for converting the optical image into electronic image signals that represent the optical image in electronic data form; electrically energizable means for receiving the electronic image signals provided by the transducer and storing these signals; an electrically energizable electro-optical display device responsive to electronic image signals applied thereto from the signal receiving and storing means for providing a visual display of the image for viewing by an operator; an electrically energizable printer with which the sheet of image receiving material is adapted to be operatively associated and being responsive to electronic image signals applied thereto from the signal receiving and storing means for printing an image of the scene on the sheet of image receiving material; and a control system including at least one manually actuable actuator for coupling components of the camera to the source of electrical energy to electrically energize the photosensitive transducer, the signal receiving and storing means and the electro-optical display device such that electronic image signals representative of the optical image of the scene are provided by the photosensitive transducer to the signal receiving and storing means and are applied therefrom to the electro-optical display device to provide thereon a visual display of the image for viewing by the operator; thereafter the control system is selectively actuable by the operator for electrically energizing the printer and applying the electronic image signals from the signal receiving and storing means to the printer to effect the printing of the image on the image recording sheet.

In a preferred embodiment, the signal receiving storing means includes a memory which is operable to provide the electronic image signals to the electro-optical display device on a repeating basis to maintain the display of the image thereon and a magnetic recording and playback device having a magnetic recording medium such as a magnetic tape supplied in a magnetic tape cassette operatively associated therewith for recording electronic image signals thereon simultaneously with the display of the image on the electro-optical display device and thereafter for playing back the recorded image signals to apply these signals to the printer to effect the rendering of a hard copy print. Provisions are made for recording a plurality of images on the magnetic tape in the form of electronic image signals and for selectively providing the recorded signals to the memory for application to the display device or to the printer to effect the rendering of a hard copy print.

In a preferred embodiment, the camera is configured to provide a full color print of the recorded image on the image receiving sheet. To provide such a full color print the camera additionally includes a color separator for separating the optical image of the scene into its red, green and blue primary color components. These primary color components are focused on the photosensitive transducer which in turn converts them into three primary color electronic image signals.

The printer is configured to be responsive to the three primary color image signals and includes means for converting the three primary color signals into equivalent secondary color signals which are converted into printing signals, by three printing transducers, in a form of energy such as pressure that is effective to selectively transfer cyan, magenta and yellow printing mediums from a transfer sheet to the image receiving sheet thereby printing out the image in the form of three overlying subtractive color dot patterns.

The printer is preferably of the scanning type including a rotating drum on which an image receiving sheet is wrapped for support and rotation and a printing head assembly including the three printing transducers which is mounted for linear axial movement along the drum in synchronization therewith such that the printing transducers scan the entire image forming area of the receiving sheet while selectively effecting the transfer of the printing mediums from the transfer sheet to the image receiving sheet of the drum.

The image receiving sheets are preferably provided in a cassette holding a plurality of such sheets and the printer includes means for sequentially advancing the sheets from the cassette into operative relationship with the drum and thereafter at least partially through an image sheet exit slot in the camera housing where the sheet may be grasped by the operator for removal.

To provide such a camera that performs the enumerated function and yet is of a size to be held in the hand of an operator, the major camera components are arranged for compact packaging. In a preferred embodiment the display device is in the form of a substantially thin planar display panel and is configured to form at least a portion of the camera housing. The image receiving sheets are provided in a cassette having a substantially thin box-like portion, the magnetic tape is provided in a substantially thin flat tape cassette and the power source preferably takes the form of a thin flat battery. The camera is structured such that the display screen, the box-like portion of the cassette of image-receiving sheets, the magnetic tape cassette and the flat battery are arranged in substantially parallel stacked relation with a major portion of the printer being disposed below these components and a flat circuit box housing electronic circuitry associated with the control being disposed above or opposite the major portion of the printer.

Therefore it is an object of the present invention to provide a hand held self-processing electronic imaging camera for electronically recording an image of a scene, for providing a visual display of the recorded image on a display device and for providing a hard copy print of the recorded image.

It is another object of the invention to provide a self-processing camera that includes a camera housing of a size that is adapted to be held in the hands of an operator, a lens for providing an optical image of a scene, a photosensitive transducer for converting the optical image into electronic image signals that represent the optical image in electronic data form, means for receiving and storing the electronic image signals, a display device responsive to the electronic image signals for providing a visual display of the image and a printer responsive to the electronic signals for printing the image on an image receiving sheet.

It is yet another object to provide such a camera wherein the display device includes a substantially flat display panel that forms part of the camera housing.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 3 is a block diagram showing the functional interrelationship of certain camera components during a third cycle of camera operation wherein a magnetic tape having recorded thereon a plurality of sequential images in the form of electronic image signals is rewound to its beginning;

FIG. 4 is a block diagram showing the functional interrelationship of certain camera components during a fourth cycle of camera operation whereby electronic image signals recorded on the magnetic tape are applied therefrom to the memory and from the memory to the electro-optical display device;

FIG. 5 is a perspective view from the front of the camera embodying the present invention showing two pivoting housing sections in a partially open position in phantom lines;

FIG. 6 is a perspective view from the back of the camera of FIG. 5;

FIG. 13 is an enlarged rear sectional view of the lower portion of the camera of FIG. 12 showing the details of a printer drum and its associated drum and printing head assembly drive system;

FIG. 14 is a perspective view of a transfer sheet adapted for use with the camera of the present invention;

FIG. 15 is a cross-sectional view of a portion of the transfer sheet of FIG. 14;

FIG. 16 is a perspective view of a cassette for holding a supply of image receiving sheets and a transfer sheet;

FIG. 17 is a schematic view of a portion of the printer showing three printing transducers in operative relationship with a set of three secondary color bands on the transfer sheet; and FIG. 18 is a cross-sectional view of a printing transducer for converting electronic image signals into pressure printing signals.

DESCRIPTION OF THE PREFERRED EMBODIMENT

Figure 1:
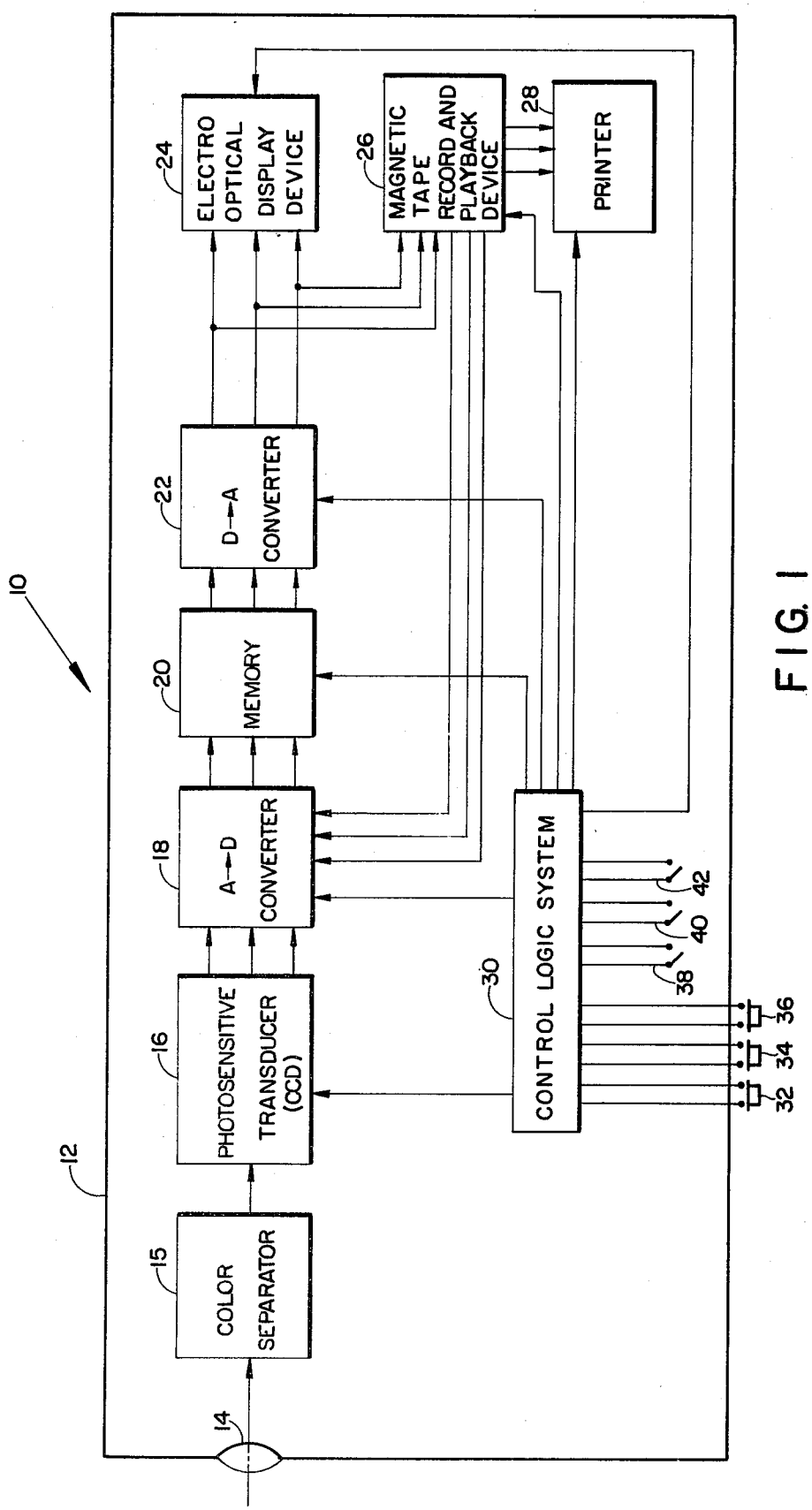
FIG. 1 is a block diagram showing the major components of a hand held, self-processing electronic imaging camera embodying the present invention.

FIG. 1 of the drawings shows, in block diagram form, the basic components of a hand-held, self-processing electronic imaging camera 10 for electronically recording an image of a scene, displaying the recorded image on an electro-optical display device so the operator of the camera may audit his results and rendering or printing out a hard copy print of the recorded image on an image receiving sheet.

The camera 10 includes a housing 12, an optical system including an objective lens or lens assembly 14 for providing an optical image of a scene to be recorded, a color separator 15 for separating the optical image into its red, green, and blue primary color components, a photosensitive transducer 16 for converting the primary color components of the optical image into corresponding analog electronic image signals that represent the optical image in electronic data form, an analog to digital (A→D) converter 18 for converting the analog signals into digital signals, a memory 20 for receiving these signals and storing the same, A D→A converter 22 for converting digital signals from the memory 20 back to analog form, an electro-optical display device 24 responsive to the electronic image signals provided from memory 20 through D→A converter 22 for providing a visual display of the image, a magnetic recording and playback unit 26 for recording electronic image signals provided from memory 20 through converter 22 on a magnetic recording medium such as magnetic tape and providing image signals from the tape when operated in the playback mode; a printer 28 responsive to electronic image signals provided from the magnetic tape for printing out or rendering a print of the image on an image receiving sheet, and a control logic system 30 for controlling, in a coordinated manner, various components of camera 10.

FIG. 1 illustrates a preferred embodiment of camera 10 wherein it is configured to provide a hard copy print of the recorded image in full color.

As will become apparent later, to provide such a color print it is necessary to drive or modulate printer 28 with three separate electronic image signals which respectively represent the red, green and blue primary color components of the optical image in electronic data form. These three separate electronic image signals are generated by separating the optical image provided by lens 14 into its three primary color components with color separator 15 and utilizing photosensitive transducer 16 to convert the three primary color components of the optical image into the three corresponding electronic image signals.

The objective lens or lens assembly 14 may be of the variable focusing type commonly used on photographic cameras and may also include a variable aperture diaphragm to compensate for various scene lighting conditions and to adjust the depth of focus. Functionally, lens 14 provides an optical image of the scene to be recorded and it is mounted on camera housing 12 in operative relation with color separator 15 and photosensitive transducer 16 such that the primary color components of the optical image may be focused on transducer 16.

Before discussing the color separator 15, the photosensitive transducer 16 will be considered. Functionally the photosensitive transducer 16 converts an optical image into electronic image signals that represent the image in electronic data form. Suitable devices for use in camera 10 include miniature vidicon tubes and solid state imaging charge couple devices (CCDs) with the CCDs being preferred because of their small size, low power consumption and long service life.

Basically, an imaging CCD includes, integrally formed on a single chip of silicon, a matrix array of photosensitive elements or sites which upon exposure to a source of light generated an electrical charge or image signal that is proportional to the intensity of the light incident thereupon, and a shift register having an equal number of corresponding receptor elements or sites to which the individual image signals are transferred after acquisition. Once the image signals have been transferred to the shift register, they can be read out sequentially by applying appropriate vertical and horizontal clock voltages or transfer pulses to the shift register array which causes the signals to shift in bucket brigade or cascade fashion in sequence to an output gate of the CCD.

The output of the CCD therefore comprises an ordered sequence of discrete electronic image signals that collectively define a single frame of image information in electronic analog data form.

One major advantage of electronic image recording is that there is no need for a shutter mechanism because the CCD has the capability of being turned on and off electronically.

In operation the CCD is initially turned off. The photosensitive elements may be fully or partially charged due to ambient light impinging thereon. Upon initial energization of the CCD it is pulsed to transfer the ambient light signals to the shift register thereby clearing the photosensitive sites which began generating image signals representing the image focused thereon by lens 14. During this integration or exposure period, the shift register is cleared of the ambient light signals transferred thereto previously. At the end of the exposure period, the image signals are transferred to the shift register and then are clocked out therefrom to memory 20 through A→D converter 18.

As noted earlier in the preferred embodiment of camera 10 the color separator 15 and the photosensitive transducer 16 function to convert the optical image provided by lens 14 into three electronic image signals which represent the three primary color components of the optical image.

To provide these three signals, photosensitive transducer 16 may include three separate imaging CCDs and the color separator 15 may include an optical system comprising dichroic mirrors disposed in a beam splitting arrangement which separates the optical image into its red, green and blue components and directs each of these three components to impinge upon a different one of the three CCDs.

Alternatively and preferably the photosensitive transducer 16 may comprise a single CCD and the color separator 15 may be embodied as alternating red, green and blue filter elements thereon such that one-third of the photosensitive elements in the array are sensitive to each of the three primary colors and this single CCD device provides the red, green and blue electronic image signals.

For the balance of the description of camera 10, it will be understood that the term electronic image signals refers to a group of three separate signals that respectively represent three color components of the optical image.

The electronic image signals provided by transducer 16 are converted from analog to digital form by A→D converter 18 and are fed into memory 20 for storage.

Memory 20 is a digital memory of the dynamic recirculating type and may be embodied in the form of an MOS, CCD or bubble domain memory. The initial function of memory 20 is to provide the electronic image signals on a repetitive basis to the electro-optical display device 24 through D→A converter 22. Because memory 20 recirculates the electronic signals on a continuous basis and there is a certain amount of signal loss during each recirculation, it is preferable to use a digital memory system because the digital signals will maintain their recognizable character for a considerable number of cycles despite the signal loss. The memory 20 is controlled by control logic 30 to repetitively cycle the electronic image signals to electro-optical display device 24 at a video rate of approximately 30 cycles/sec.

The electro-optical display device 24 preferably takes the form of a thin flat electro-optical display panel or screen.

One type of display panel 24 suitable for use in camera 10 is a thin film transistorized electroluminescent panel. The panel comprises a matrix array of separately addressable and energizable picture elements disposed between opposed glass cover sheets. Each picture element comprises two thin film transistors, a storage capacitor and a dot of phosphor material.

The transistors are arranged in matrix fashion in columns and rows such that when both transistors of an element are actuated by applying signals through appropriate drive and scanning circuits to a designated column and row, current flows through the picture element and causes the dot to glow. The transistorized matrix allows separate picture elements to be energized without activating other picture elements in the same row or column. Other suitable types of flat display panels may include liquid crystal or ferroelectric ceramic picture devices.

Memory 20 also provides electronic image signals through D→A converter 22 to the magnetic recording and playback device 26 for recording on magnetic tape a single frame or cycle of image information. This occurs simultaneously with memory 20 providing the electronic image signals to electro-optical display panel 24. Recording and playback device 26 is of the type in which the recording and playback rate may be varied. That is, the electronic image signals are recorded at the relatively fast video rate but may be played back at a relatively slow rate when the tape is used to provide signals to the printer 28 or alternatively may be played back at the video rate when the tape is used to provide signals to the memory 20 through A→D converter 18 for the purposes of displaying previously recorded images.

As noted earlier, the term electronic image signals includes a group of three image signals and the recording and playback device 26 is configured to record and playback these signals on three separate channels.

To make a hard copy print of the recorded image the record and playback device 26 is operated in the playback mode at a relatively slow rate and the electronic image signals are applied to the printer 28.

The printer 28, to be described in detail later, operates in a subtractive color mode and forms the color print by printing out on a receiving sheet overlying secondary color dot patterns to reproduce the light intensities and color content of the original scene. The dot patterns are produced by effecting the selective transfer of secondary color (cyan, magenta and yellow) printing mediums from a transfer sheet to an image receiving sheet in accordance with three secondary color image signals that are derived from the three primary color image signals.

In a preferred embodiment, the image receiving material may comprise a plain sheet of high quality printing grade paper that is receptive to color printing mediums such as inks and dyes that are used in commercial printing processes.

The color printing mediums are preferably provided on a transfer sheet having a repeating series of three adjacent stripes or bars of secondary color inks or dyes (cyan, magenta and yellow) thereon.

The printer 28 is of the scanning type and includes means for electronically converting the three primary color image signals into three corresponding secondary color image signals, a rotatably driven drum on which the receiving sheet is wrapped and a printing head assembly mounted for synchronized axial movement along the drum and including three printing transducers, one for each of the three secondary color image signals, that convert the secondary color image signals into printing signals that are in a form of energy that is effective to transfer the secondary color mediums from the transfer sheet to the image receiving sheet.

The control logic system 30 includes a plurality of electronic circuits, to be described later, that provide the various timing, gate switching, sequencing, control and synchronization signals and signal amplification required by the photosensitive transducer 16, A→D converter 18, memory 20, D→A converter 22, display device 24, recording and playback device 26 and printer 28.

The control logic system also includes control switches 32, 34, 36, 38, 40 and 42. The switches 32, 34 and 36 are button-type switches which are manually actuable by the operator. Switch 32 is operable to initiate a cycle of operation wherein an optical image is converted into electronic image signals which are fed through memory 20 to display device 24 for image display and simultaneously to record and playback device 26 for recording the signals on magnetic tape. Switch 34 is operable to initiate a cycle of operation wherein the magnetic tape holding a plurality of electronically recorded images thereon is rewound to the beginning of the tape. Switch 36 is operable to initiate a cycle of operation wherein previously recorded image information on the magnetic tape is played back and is fed to memory 20 through A→D converter 18 and then to the display device 24 from memory 20 through D→A converter 22.

The switches 38, 40 and 42 are associated with printer 28 and they are actuated by a later-to-be-described movable printing head assembly forming part of printer 28. Briefly, switch 38 is operable to rewind the magnetic tape in device 26 one picture frame (i.e., one electronically recorded image) in preparation to feed the electronic image signals comprising the picture frame to printer 28. In response to moving the printing head assembly to an operative position wherein it is located to begin a printout cycle, switch 40 is actuated and it initiates a print cycle wherein the recorded and playback device 26 feeds the electronic image signals to a converter in printer 28 which converts them to corresponding secondary color signals which are fed to the printing transducers on the printing head assembly while the printer drum is rotated and the printing head assembly is driven along the drum to effect the selective transfer of the secondary color printing mediums from the transfer sheet to the image receiving sheet on the drum. At the end of the printout cycle, the printing head assembly has moved to a position wherein it actuates switch 42 which is operable to initiate a cycle of operation wherein the image receiving sheet is advanced from the printer drum and out through a withdrawal slot in camera housing 12 where it is accessible to the camera operator.

The various functions of control logic system 30 will be explained in more detail with reference to FIGS. 2, 3 and 4 and it will be understood that circuits shown therein which are numerically designated by sequential even numbers 44 through 66 form part of control logic system 30.

Figure 2:
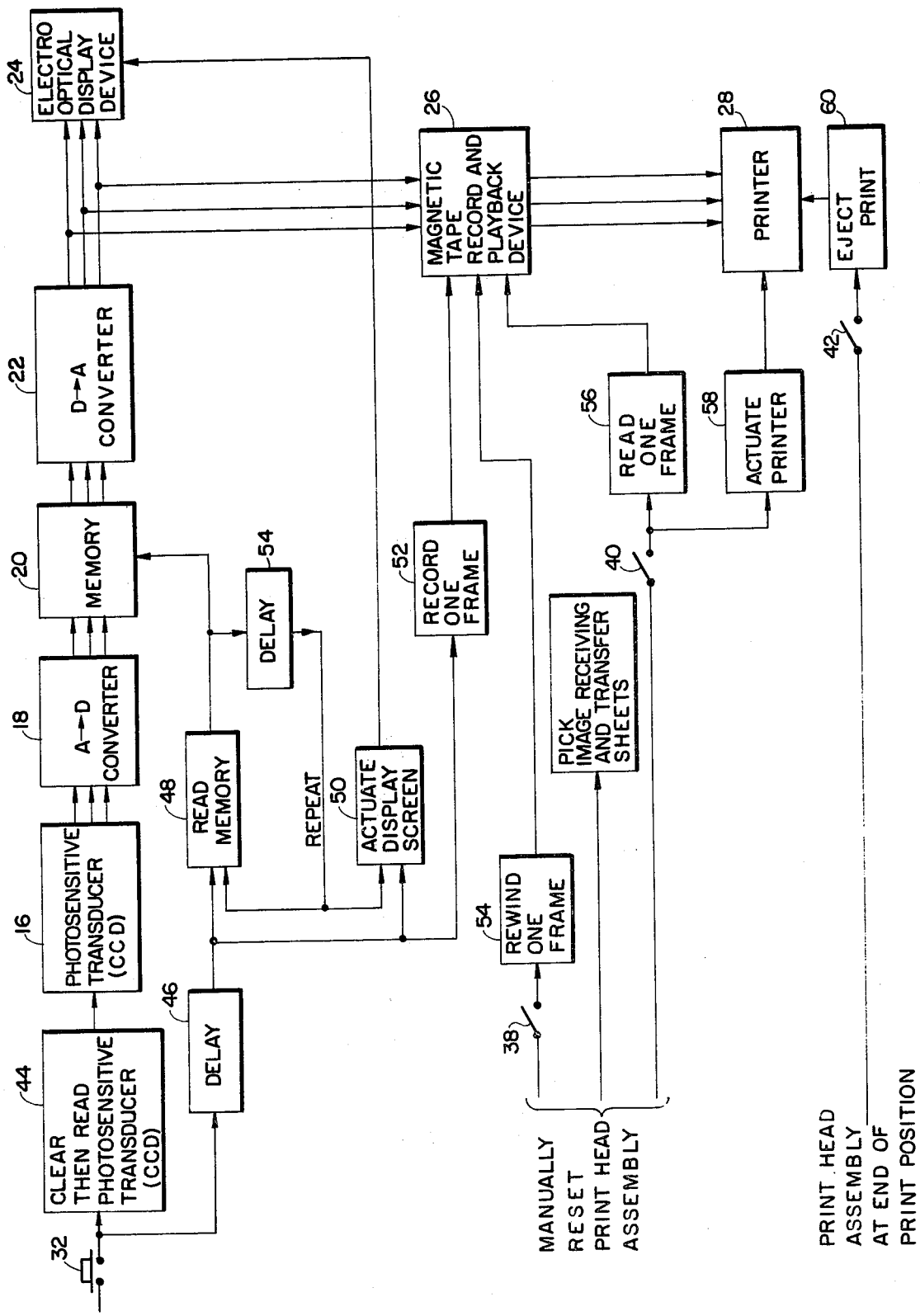
FIG. 2 is a block diagram showing the functional interrelation of certain camera components during a first cycle of camera operation wherein an image is electronically recorded and displayed on an electro-optical display device and a second cycle of operation wherein the recorded image is printed on an image receiving sheet.

FIG. 2 shows in block diagram form the cycle of camera operation wherein an image of a scene is electronically recorded and displayed and also the cycle wherein a hard copy print of a recorded image is produced. After focusing lens 14 and framing the scene to be recorded with the aid of a later-to-be-described viewer, the electronic image recording and display cycle is initiated by the manual actuation or closing of the normally open button switch 32. The closing of switch 32 causes the transducer 16, A→D converter 18, memory 20, D→A converter 22, display device 24, record and playback device 26 and the control logic system 30 to be electrically energized by electrically coupling them to a source of electrical energy such as a battery to be described later in connection with the physical description of camera 10.

Actuation of switch 32 provides a cycle start signal which actuates a CLEAR THEN READ CCD 16 circuit 44 coupled to transducer 16 (preferably a CCD) that clears and then reads CCD 16 which provides the red, green and blue image signals that are fed into memory 20 through A→D converter 18. As noted earlier camera 10 does not require a shutter because the exposure interval is controlled by the operation of CCD 16. Before the CCD 16 is energized in response to actuating switch 32, the photosensitive elements of the CCD may be either fully or partially charged by ambient illumination transmitted to CCD 16 by lens 14. Initially circuit 44 provides a clear signal to CCD 16 which is effective to transfer the ambient light signals to the shift register and to clock them out of the shift register to a ground sink thereby discarding these signals. Once the photosensitive elements are cleared the optical image focused on CCD 16 begins to charge the photosensitive elements in proportion to the intensity of the image bearing light impinging thereupon. At the end of the exposure or integration period, the duration of which may be controlled by a photocell forming part of circuit 44 which monitors scene lighting conditions, circuit 44 provides a pulse signal to transfer the image signals from the photosensitive elements to the shift register and then provides the appropriate horizontal and vertical clock voltages to the shift register to "read out" the red, green and blue electronic image signals which are transmitted to memory 20 through A→D converter 18.

The cycle start signal provided in response to closing switch 32 is delayed by a DELAY circuit 46 and then serves as an input signal for a READ MEMORY circuit 48 coupled to memory 20, an ACTUATE DISPLAY SCREEN circuit 50 coupled to display device 24, and a RECORD ONE FRAME circuit 52 coupled to the tape record and playback device 26.

DELAY circuit 46 provides a suitable delay to allow the conversion of the optical image into the primary color electronic image signals by CCD 16 and the subsequent transmission of these signals into memory 20 for the storage.

At the end of the delay provided by circuit 46 the READ MEMORY circuit 48 provides an output in the form appropriate clock and gating signals for memory 20 to cause the electronic image signals to be fed to display device 24 through D→A converter 22 at approximately a video rate. At the same time the display device 24 is actuated by the ACTUATE DISPLAY SCREEN circuit 50 which provides the appropriate drive and scanning signals to display device 24 such that device 24 is responsive to the electronic image signals from memory 20 through D→A converter 22 for visually displaying the recorded image thereon.

As noted earlier in order to maintain the image on display device 24 the output signals of memory 20 must be repetitiously applied thereto. To maintain the continuous application of these signals and synchronous operation of display device 24, a portion of the output of the READ MEMORY circuit 48 is delayed by DELAY circuit 54 and then fed back to the input of both the READ MEMORY circuit 48 and the ACTUATE DISPLAY SCREEN circuit 50 so as to repeat the operation of these two circuits. The electronic image signals will be fed to display device 24 on a continuous basis until deenergization occurs in response to releasing or opening switch 32.

During the course of the visual display on display device 24 the electronic image signals are fed from memory 20 through D→A converter 22 to the tape recording and playback device 26 which is operated under the control of the RECORD ONE FRAME circuit 52. Actuated by the delayed signal from DELAY circuit 46, circuit 52 provided the tape recording and playback device 26 with appropriate control and drive signals such that device 26 operates in a record mode at a relatively fast rate which is compatible with the approximate video rate of the electronic image signals being fed to device 26 and records one full frame of image information on a magnetic tape. The one full frame of image information is of course one cycle of the signal read out from memory 20. Even though memory 20 operates on a continuous cycle to feed display device 24, only one full cycle or frame of the memory output is recorded on magnetic tape by device 26. Circuit 52 also provides appropriate signals to device 26 to cause a cue signal to be recorded at the beginning and end of each frame as references to separate successively recorded frames of image information.

As noted earlier, the electronic image signals will be provided on a continuous basis to display device 26 while switch 32 is in its closed or conducting position. Once switch 32 is released or opened, the components and circuits are deenergized and the electronic image signals are automatically deleted from memory 20. However, a record of the electronic image signals corresponding to the optical image is recorded on the magnetic tape from where it may be recalled for printout by printer 28 or display on display device 24.

At the end of the first cycle of camera operation the camera operator has an option. He can either take another "picture," i.e. electronically record and display another image, or he may initiate a second cycle of camera operation during which the previously recorded image on the magnetic tape is printed out by printer 28.

The printout cycle is initiated and controlled in response to the sequential actuation of switches 38, 40 and 42. As will be explained in detail later, switches 38 and 40 are actuated in response to the operator's manually resetting a printing head assembly forming part of printer 28 and switch 42 is actuated when the printing head is driven to one of its two terminal positions following the image printout.

The initial closing of switch 38 energizes tape record and playback device 26 and control system 30 and provides an input signal to actuate a REWIND ONE FRAME circuit 54 forming part of system 30 and being coupled to tape record and playback device 26. Upon actuation of circuit 54, it provides output signals to device 26 which reverse a later-to-be-described tape drive system and rewinds the tape one frame at the relatively fast rate previously used for recording. Once the tape has been rewound one frame as defined by the previously recorded cue signals, circuit 54 provides device 26 with an appropriate signal to shut off the tape drive and reset it to its forward drive mode.

As will be described later, the manual movement of the print head assembly causes the operation of a mechanical picking device which advances an image receiving sheet and transfer sheet into operative relation with printer 28. At the end of the normal movement the printing head assembly engages and closes switch 40 causing tape record and playback device 26, printer 28, a READ ONE FRAME circuit 56 coupled to device 26 and an ACTUATE PRINTER circuit 58 coupled to printer 28 to be energized. The closing of switch 40 also produces a signal which actuates circuits 56 and 58. Circuit 56 provides output signals that operates tape record and playback device 26 in a playback mode at a relatively slow rate thereby feeding the three primary color electronic image signals to printer 28. Simultaneous with the operation of device 26, circuit 58 provides output signals which energize a later-to-be-described motor in printer 28 that rotatably drives the drum having an image receiving sheet thereon and linearly drives the printing head assembly carrying the three printing transducers thereon along the drum. As noted earlier, the printer 28 includes means for electronically converting the primary color electronic image signals to corresponding secondary color signals which are applied to the three printing transducers. The printing transducers in turn convert the image signals into printing signals in a form of energy, such as pressure, that is effective to cause the selective transfer of magenta, cyan and yellow printing mediums from the transfer sheet to the image receiving sheet thereby printing out a full color print of the recorded image.

At the end of its linear path of travel, the printing head assembly engages and closes the normally open switch 42 which causes the energization and actuation of an EJECT PRINT circuit 60 coupled to the drive motor of printer 28. Upon actuation, circuit 60 brakes the motor thereby stopping the rotation of the drum. Circuit 60 then provides a reverse drive voltage to the motor which causes the drum to rotate for one revolution in a direction opposite that of its rotation during the printout mode. As will become apparent later, this one reverse revolution of the drum is effective to eject or advance the print at least partially through a withdrawal slot in camera housing 12.

Assume now that a number of images have been recorded and are stored in sequence on the magnetic tape and the operator wishes to review these images by having them displayed on the display device 24.

The first step is to completely rewind the tape to its beginning. To do this operator manually actuates button switch 34. As best shown in FIG. 3, the closing of switch 34 energizes the tape record and playback device 26 and energizes and actuates a COMPLETELY REWIND TAPE circuit 62 coupled to device 26. Circuit 62, when actuated, provides output signals to the tape record and playback device 26 causing its drive system to be shifted to reverse and operated at the relatively fast rate to rewind the magnetic tape back to its beginning. Once the tape is rewound, circuit 62 causes the tape drive to shift back to the normal forward drive mode and device 26 and circuit 62 are deenergized.

To display the images on the tape, the camera operator manually actuates or closes the normally open button switch 36 (See FIG. 4) which causes tape record and playback device 26, 2→D converter 18, memory 20, D→A converter 22, display device 24 and control logic system 30 to be energized. The closing of switch 36 also provides a cycle start or actuating signal to a READ ONE FRAME circuit 64 coupled to the tape record and playback device 26. Circuit 64 provides appropriate control signals to device 26 which causes device 26 to operate in the playback mode at the relatively fast rate thereby reading out the primary color electronic image signals defining the first frame of image in formation on the tape and feeding these signals to memory 20 through A→D converter 18. The actuating signal provided by the closing of switch 36 is delayed by a DELAY circuit 66 which provides a delay sufficient to allow the first frame of image signals on the tape to be read into memory 20. After this delay the actuating signal is applied to the previously described READ MEMORY circuit 48 and ACTUATE DISPLAY SCREEN circuit 50. As noted earlier circuit 48 and 50 operate on a repeating basis due to the feed back loop through DELAY circuit 54 such that the electronic image signal in memory 20 are fed to the display device 24 through D-A converter 22 on a repeating basis at approximately a video rate. These signals will continue to recirculate to maintain the image on display device 24 while switch 36 is held in its closed position. However, once switch 36 is released the circuits and devices are deenergized thereby causing the image signals to be automatically deleted from memory 20.

The images recorded on the magnetic tape may be displayed in sequence by repeated actuations of switch 36. Upon each actuation of switch 36 the next frame of image information is read from the tape into memory 20 and then from memory 20 to the display device 24. Upon opening switch 36, this image information is deleted from memory 20 and the system is automatically reset to display the next frame of image information on the tape is response to the next actuation of switch 36.

If the camera operator should decide to make a print of the displayed image, he manually resets the printing head assembly thereby actuating switches 38 and 40 to initiate the print out cycle described earlier with reference to FIG. 2.

As best shown in FIGS. 5 through 9 the camera housing 12 comprises first, second and third housing sections designated 68, 70 and 72 respectively.

The first housing section 68 is the base or main housing section and is defined by a top wall 74, a pair of generally L-shaped side walls 76 and 78, a bottom wall 80, a forward wall section 82 and a rear wall section 84. The top wall 74 and the relatively narrow upper portions of side walls 76 and 78 define three sides of a generally vertically disposed upper rectangular framelike section of housing 68, the fourth side of which is bounded by the top edge of wall section 82 while the lower portions of side walls 76 and 78, bottom wall 80, forward wall section 82 and rear wall section 84 cooperate to define a box-like hollow lower section of housing 68 which extends downwardly and rearwardly of the upper vertical section.

The second housing section 70 is defined by a generally rectangular forward wall 86 and a peripheral section including a top wall 88, a pair of side walls 90 and 92 and an inclined bottom wall 94. As best shown in FIG. 5, housing section 70 is pivotally coupled along its side wall 90 to the forward edge of the upper portion of side wall 76 of housing 68 at hinge 96 for movement between a normally closed operative position shown in solid lines in FIG. 5 wherein section 70 is located in alignment with and forms an enclosing forward extension of the upper portion of housing section 68 and an open position (beyond that suggested by the phantom lines in FIG. 5) wherein section 70 is spaced from the forward side of the upper portion of housing 68 to permit a magnetic tape cassette to be inserted into or withdrawn from a latter-to-be-described cassette receiving chamber that is formed in part by housing section 70 located in its closed operative position.

The third housing section 72 is defined by a top wall 98, a pair of side walls 100 and 102 and a rear wall 104 that is defined in part by the display device 24. Section 72 is pivotally coupled along its side wall 102 to the rear edge of the upper portion of the side wall 78 of housing 68 at hinge 106 for pivotal movement between its normal operative closed position wherein it is in alignment with and forms an enclosing rearward extension of the upper section of housing section 68 located over the rearwardly extended portion of the lower section of housing 68 and an open position (beyond that shown in phantom lines in FIG. 5) wherein section 72 is spaced from the rear side of the upper portion of housing 68 to permit a cassette holding a stack of image receiving sheets and a transfer sheet to be inserted into and withdrawn from a later-to-be-described cassette receiving chamber which is formed in part by section 72 located in its closed position.

As shown in FIGS. 5 and 6, housing section 70 is latched in its closed position by a latch member 108 on side wall 92 that engages a detent on side wall 78 of housing section 68 and housing section 72 is similarly latched by a latch member 110 on side wall 100 that enages a detent on side wall 76 of housing section 68.

Figure 8:
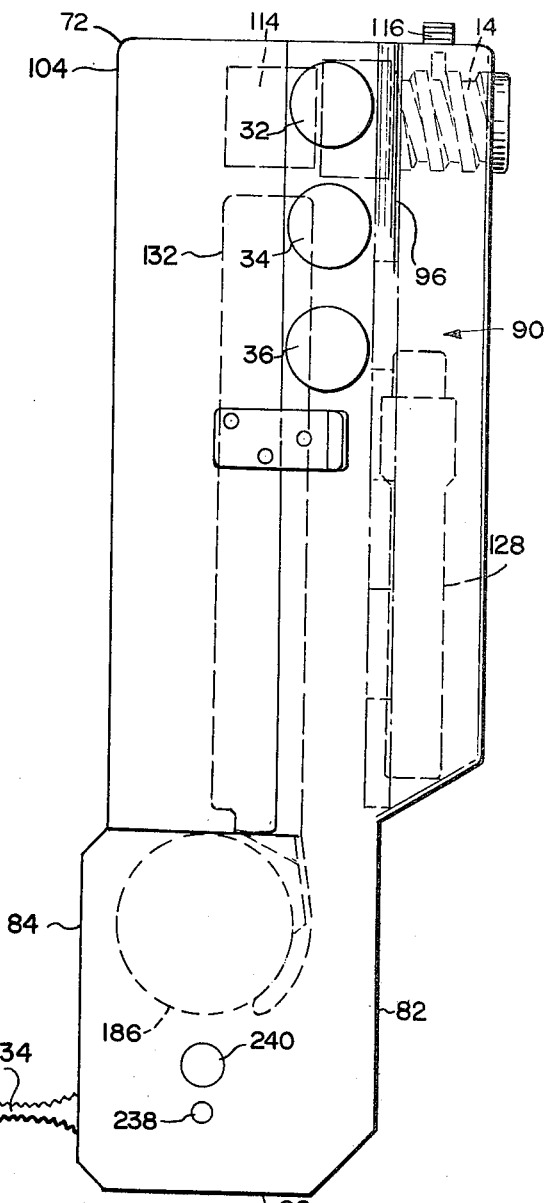
FIG. 8 is the opposite side elevational view of the camera of FIG. 7 showing certain interior components in dotted lines.
Figure 9:
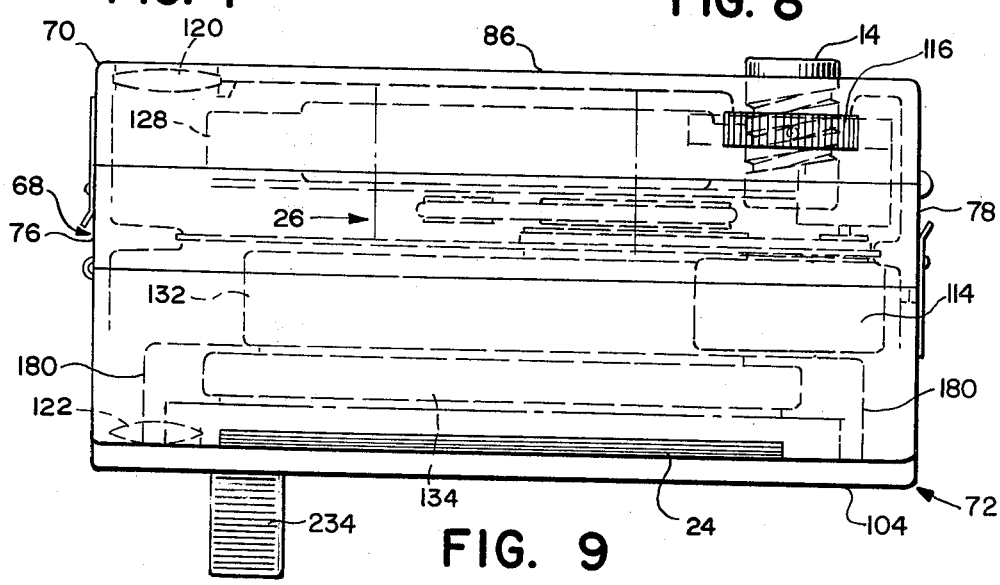
FIG. 9 is a top plan view of the camera embodying the present invention showing certain interior components in dotted lines.

As best shown in FIGS. 5, 8 and 9, the objective lens 14 is mounted in an upper corner section of housing section 70 adjacent side wall 90 in alignment with a lens aperture 112 in forward wall 86. Mounted directly behind and in optical alignment with lens 14 in housing section 68 is a module 114 housing the color separator 15 and the photosensitive transducer or solid state imaging charge coupled device CCD 16. To move lens 14 relative to CCD 16 for focusing purposes, the camera operator manually rotates a focus wheel 116 which is coupled to lens 14 and is accessible through an aperture 118 in the top wall 88 of housing section 70.

The camera's optical system also includes a viewing device for viewing and framing the scene to be recorded. In the illustrated camera 10 the viewing device is located on the opposite side of the upper portion of the camera housing 12 from lens 14 and is a direct viewing device comprising a forward lens element 120 mounted on forward wall 86 of housing section 70 and a rear or eye lens 122 mounted on the rear wall 104 of housing section 72 in optical alignment with forward lens element 120. Although the viewing device is illustrated as being the direct viewing type, it will be understood that it is within the scope of the present invention to provide other types of viewing systems including a single lens reflex system incorporating objective lines 14 therein.

Located in the upper portion of camera housing 12 between the objective lens 14 and module 114 on one side and the viewing device on the other is a substantially thin, planar box-like electronic circuits module 124 (see FIGS. 9 and 11) that houses a plurality of integrated electronic circuits that define A→D converter 18, memory 20, D→A converter 22, the control logic system 30 (including the individual circuits and subsystems thereof described earlier with reference to FIGS. 1 through 4) and other electronic circuits that are to be described later in the disclosure. The electronic circuits are appropriately interconnected and are coupled to the devices they control by appropriate wiring and thin flexible circuit connectors that are not shown in the drawings for the sake of clear illustration.

Figure 7:
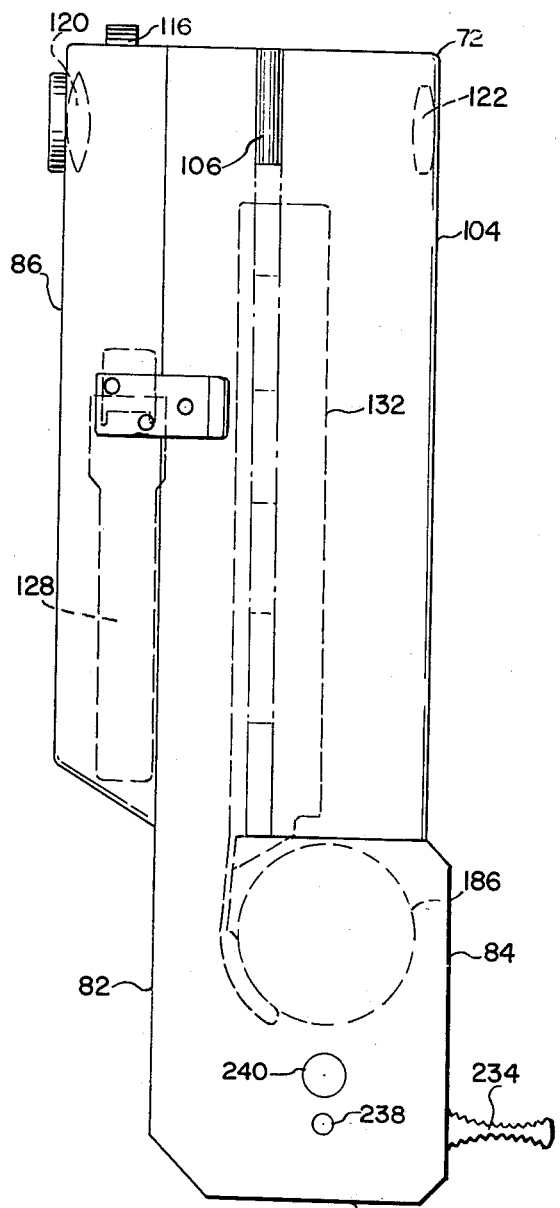
FIG. 7 is a side elevational view of the camera embodying the present invention with certain interior components shown in dotted lines.
Figure 12:
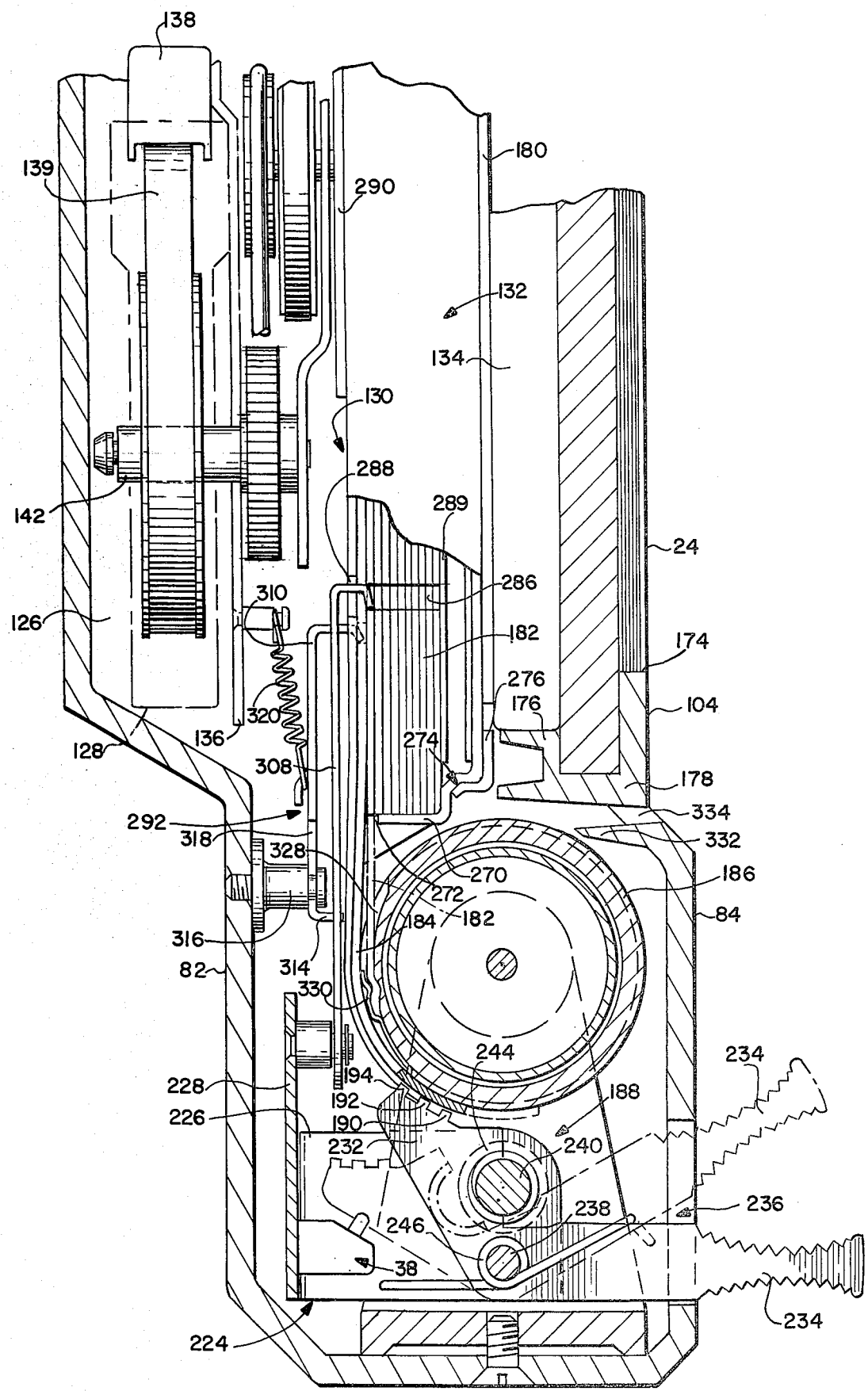
FIG. 12 is an enlarged side sectional view of a portion of the camera embodying the present invention showing the structure of certain components including a printer.

As best shown in FIGS. 7, 8 and 12, the space below lens 14, module 114, the viewfinder device and electronic circuits module 124 in the upper part of housing 12 defined by the upper portion of housing section 68 and housing sections 70 and 72 is occupied, from front to rear and in substantially parallel relation to one another, by a chamber 126 for replaceably receiving a magnetic tape cassette 128, structure defining a major portion of the record and playback device 26, a chamber 130 for replaceably receiving a cassette 132 housing a stack of image receiving sheets and a transfer sheet, means for receiving and supporting a thin flat battery 134 for powering the electrical components of camera 10 and the flat panel display device 24. Also mounted on the upper portion of camera housing 12 are the three manually actuable button switches 32, 34 and 36 forming part of control logic system 30. These switches are located on the upper portion of side wall 76 of housing section 68 as best shown in FIG. 5. The lower portion of housing section 68 is occupied by the major components of the printer 28.

The chamber 126 for receiving magnetic tape cassette 128 is defined by the lower portion of housing section 70 located in its closed position and a vertically disposed base or component mounting plate 136 of record and playback device 26 mounted in the forward portion of the upper section of housing section 68. Access for moving a cassette 128 into and out of operative relation with device 26 is provided by moving the hinged housing section 70 to its open position.

As noted earlier, the magnetic tape record and playback device 26 is a three channel recorder that is adapted to record and playback at both relatively fast and slow speeds.

Figure 10:
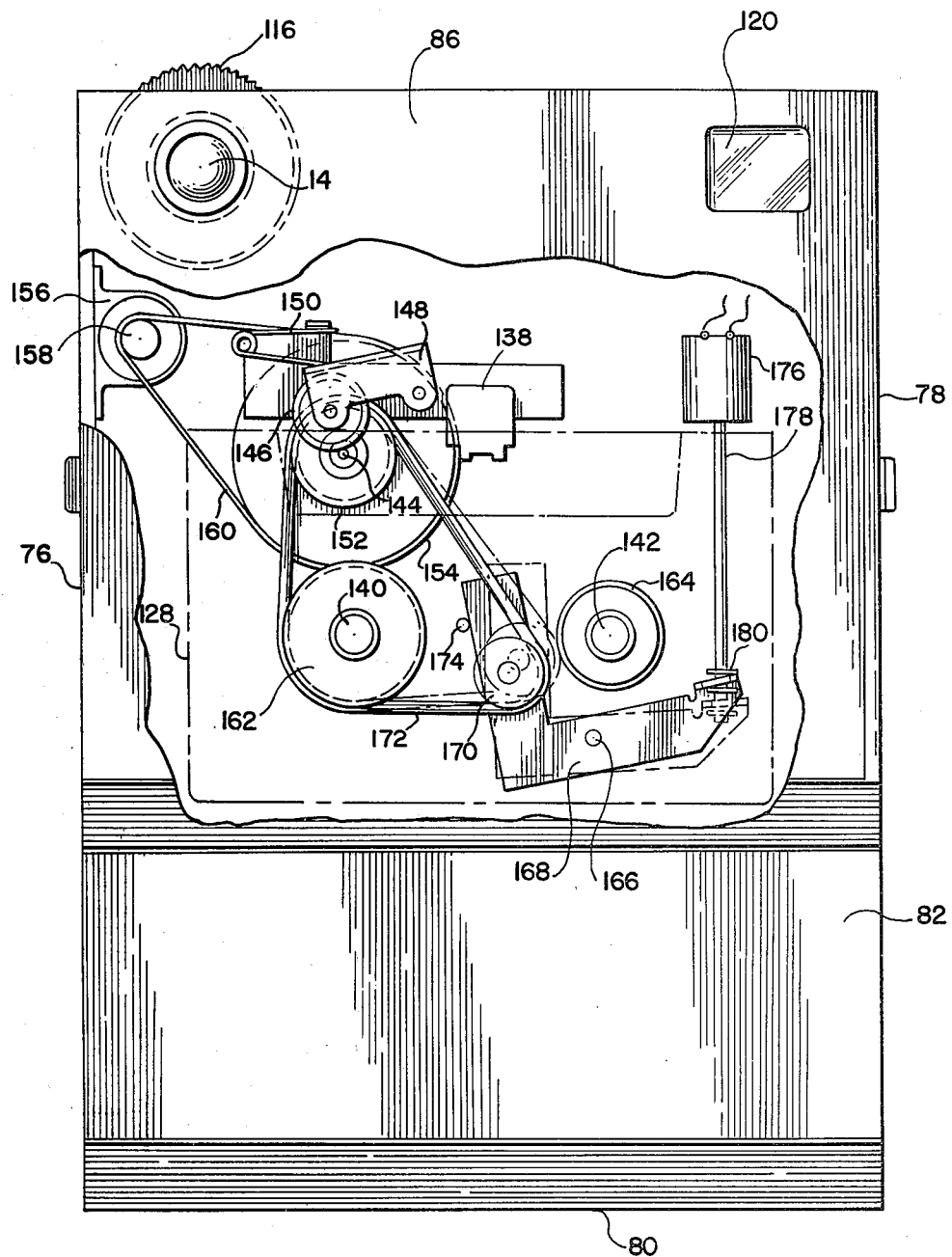
FIG. 10 is a front elevational view of the camera embodying the present invention having a portion of the housing cut away to show details of a magnetic record and playback device.

As best shown in FIGS. 10 and 12, record and playback device 26 includes a three channel magnetic record and playback head 138 mounted on the forward side of mounting plate 136 in position to engage a magnetic tape 139 coupled between supply and take up reels of cassette 128. Mounted on the back side of plate 136 and extending therethrough into chamber 126 is a pair of spindles 140 and 142 for receiving the hubs of the tape supply and take up reels in cassette 128 and a capstan assembly drive shaft or pin 144 which is rotatably driven and serves to drive the tape 139 held against shaft 144 by a rubber roller 146, past the record and playback head 138. The rubber roller 146 is mounted on the front side of plate 136 by means of a pivoting bracket 148 that is urged toward capstan drive shaft 144 by means of a spring 150 thereby providing the biasing force for rubber roller 146 to hold the tape against shaft 144.

The capstan assembly comprises the tape drive shaft 144 and a spindle drive pulley 152 and a flywheel 154 mounted in stacked relation on shaft 144 for rotation therewith about a common axis. The means for driving the capstan assembly includes a variable speed electrical motor 156 mounted on side wall 76 of housing section 68 and having its output shaft 158 coupled to the flywheel 154 by means of a drive belt 160.

The rotating capstan assembly in turn serves to alternately drive either reel drive spindle 140 or 142 depending on whether the tape is to be driven forwardly for recording or playback or is to be driven in reverse for rewinding the tape.

As best shown in FIG. 10, the rearward end of spindle 140 behind plate 136 has a pulley and slip clutch assembly 162 secured thereto and the rearward end of spindle 142 has a friction wheel 164 secured thereto. Pivotally coupled to the rear side of plate 136 at pin 166 is an L-shaped spindle drive reversing lever 168 having a pulley 170 mounted on a section of lever 168 located behind the pulley and clutch assembly 162 on spindle 140 and the friction wheel 164 on spindle 142.

The spindle drive pulley 152 of the capstan assembly, the pulley and clutch assembly 162 on spindle 140 and the pulley 170 on spindle drive reversing lever 168 are coupled together in driving relation by a resilient drive belt 172 which may be formed of any suitable resilient material such as rubber. The tension of the drive belt 172 acting on pulley 170 pivots lever 168 in a counterclockwise manner about pin 166 and holds lever 168 against a stop pin 174 on plate 136. In this position of lever 168 shown in solid lines in FIG. 10, the reel drive spindle 140 is driven in a counterclockwise manner by belt 172 in response to a counterclockwise drive of the capstan assembly including pulley 152 by the motor 156. In this mode of operation the tape is driven forwardly over head 138 for recording or playback by capstan tape drive shaft 144 in cooperation with the pressure roller 146 and the spindle 140 drives the take-up reel of the cassette 128 coupled thereto to take up the advancing tape thereon. During the forward tape drive mode, the spindle 142 is not driven but rather is free to rotate and the supply reel coupled thereto turns freely in response to the pull of the advancing tape.

In preparation for rewinding the tape it is necessary to disengage the tape drive and reverse the spindle drive.

The spindle drive is reversed by pivoting the lever 168 in a clockwise manner about pin 166 thereby shifting the pulley 170 thereon towards the friction wheel 164 on spindle 142 until the portion of drive belt 172 that passes around pulley 170 and extends outwardly therefrom frictionally engages the periphery of friction wheel 164 in driving relation. The movement of belt 172 to the reverse spindle drive position shown in dotted lines in FIG. 10 also actuates the clutch assembly 162 thereby disengaging the pulley of assembly 162 from its driving relation with spindle 140.

The means for moving the lever 168 from its forward to its reverse position includes a solenoid 176 mounted on plate 136 and having an elongated shaft 178 having its free end coupled to lever 168 as suggested at 180. Solenoid 176 is shown in its unenergized state with lever 168 located in its forward drive position. Upon energization of solenoid 176, shaft 178 is driven downwardly from the position shown in FIG. 10 and pivots lever 168 in a clockwise manner about pin 166 thereby moving the lever to the reverse spindle drive position. Although not shown in the drawings, device 26 also includes a linkage for moving the pressure roller 146 and record and playback head 138 upwardly when lever 168 is pivoted to the reverse drive position thereby freeing the tape for rewind in response to driving spindle 142 in a clockwise manner.

Now when the capstan assembly is driven in a counter clockwise rotating direction by motor 156 the counter clockwise rotating drive belt 172 drives the friction wheel 164 and spindle 142 in a clockwise direction thereby driving the supply reel of cassette 128 thereon in a clockwise direction to rewind the tape.

As noted earlier, record and playback device 26 is configured to be operated at a relatively fast rate (approximately a video rate) when (1) the electronic image signals are initially recorded, (2) the tape is rewound one frame before printout or is completely rewound, and (3) the electronic image signals are played back into memory 20 for display on device 24 and at a relatively slow rate (audio rate) when the tape is used to feed the electronic image signals to the printer 28. The operating rate of device 26 is varied by varying the speed of the drive motor 156 which is in turn controlled by the appropriate subcircuits of logic control system 30 which also control the operation of solenoid 176.

As best shown in FIGS. 7, 8 and 12, the cassette 132 which holds a stack of image receiving sheets and a transfer sheet is adapted to be operatively located in the cassette receiving chamber 130 located to the rear of record and playback device 26. Access to chamber 130 is provided by moving the hinged housing section 72 to its open position.

As best shown in FIG. 12, the flat display device 24 is mounted on the interior side of the rear wall 104 of housing section 72 in alignment with an opening 174 in wall 104 which provides visual access to to device 24 for viewing. The display device 24 may be thought of as defining a part of camera housing 12 in that it cooperates with wall 104 to form a closure for the rear portion of camera 10.

Housing section 72 also mounts the flat battery 134 in overlying parallel relation to the back side of display device 24. The means for receiving and supporting battery 134 include a raised horizontal support member 176 which is integrally formed with a bottom wall section 178 of housing section 72 and against which the bottom edge of the battery 134 rests and a pair of vertically disposed channel members 180 which slidably receive the lateral edges of battery 134 (see FIG. 9).

Before describing cassette 132, its contents (a stack of image receiving sheets 182 and a transfer sheet 184) and the structure defining the cassette receiving chamber 130, the printer 28 will be described with reference to FIGS. 7, 11, 12 and 13.

The printer 28 located in the lower section of housing section 68, includes a rotatably mounted hollow cylindrical drum 186 for supporting and rotating an image receiving sheet 182 wrapped on an exterior surface of drum 186 and a printing head assembly 188 mounted for linear axial movement along the drum surface and mounting thereon three printing transducers 190, 192 and 194 to which three secondary color image signals, derived from the three primary color image signals fed to printer 28, are applied for converting the secondary color image signals into corresponding printing signals in a form of energy such as pressure that is effective to cause the selective transfer of secondary color printing mediums from the transfer sheet 184 to an image receiving sheet 182 on drum 186.

In a preferred embodiment the means for driving drum 186 and the printing head assembly 188 include a small high speed reversible electrical motor 196 and its associated drive train located within the hollow center of drum 186.

As best shown in FIG. 13, a view looking into the lower section of housing section 68 from the rear of camera 10 with wall section 84 removed, the drum 186 the drive means and the printing head assembly 188 are shown mounted on a generally U-shaped support frame 198 secured to the bottom wall 80 of housing section 68.

The hollow drum 186 is rotatably supported by a pair of internal bearings 200 and 202 mounted on opposed support members 204 and 206 that are fixedly secured to opposite sides of support frame 198 and extend into the hollow center of drum 186.

Motor 196 is fixedly secured to support member 206 and includes a pair of electrical power leads 208 and 210 through which motor 196 is energized. The motor's output shaft 212 is coupled to a speed reducing gear train assembly 214 which is fixedly secured to support member 206 and has an output shaft 216. Fixedly secured to shaft 216 is a drum drive gear 218 which is in mesh with an internal gear 220 secured to the internal cylindrical surface of drum 186. The output shaft 216 of the speed reducer 214 extends beyond gear 218 and through support member 204 and support frame 198 and has a gear 222 fixedly secured to the end thereof which serves as a power take off gear for driving the printing head assembly 188.

As noted earlier, the printing head assembly 188 is mounted for linear axial movement along the drum 186 as drum 186 is rotated such that the printing transducers 190, 192 and 194 scan the entire image receiving area of an image receiving sheet 182 on drum 186 during the course of a printout cycle of operation.

Figure 11:
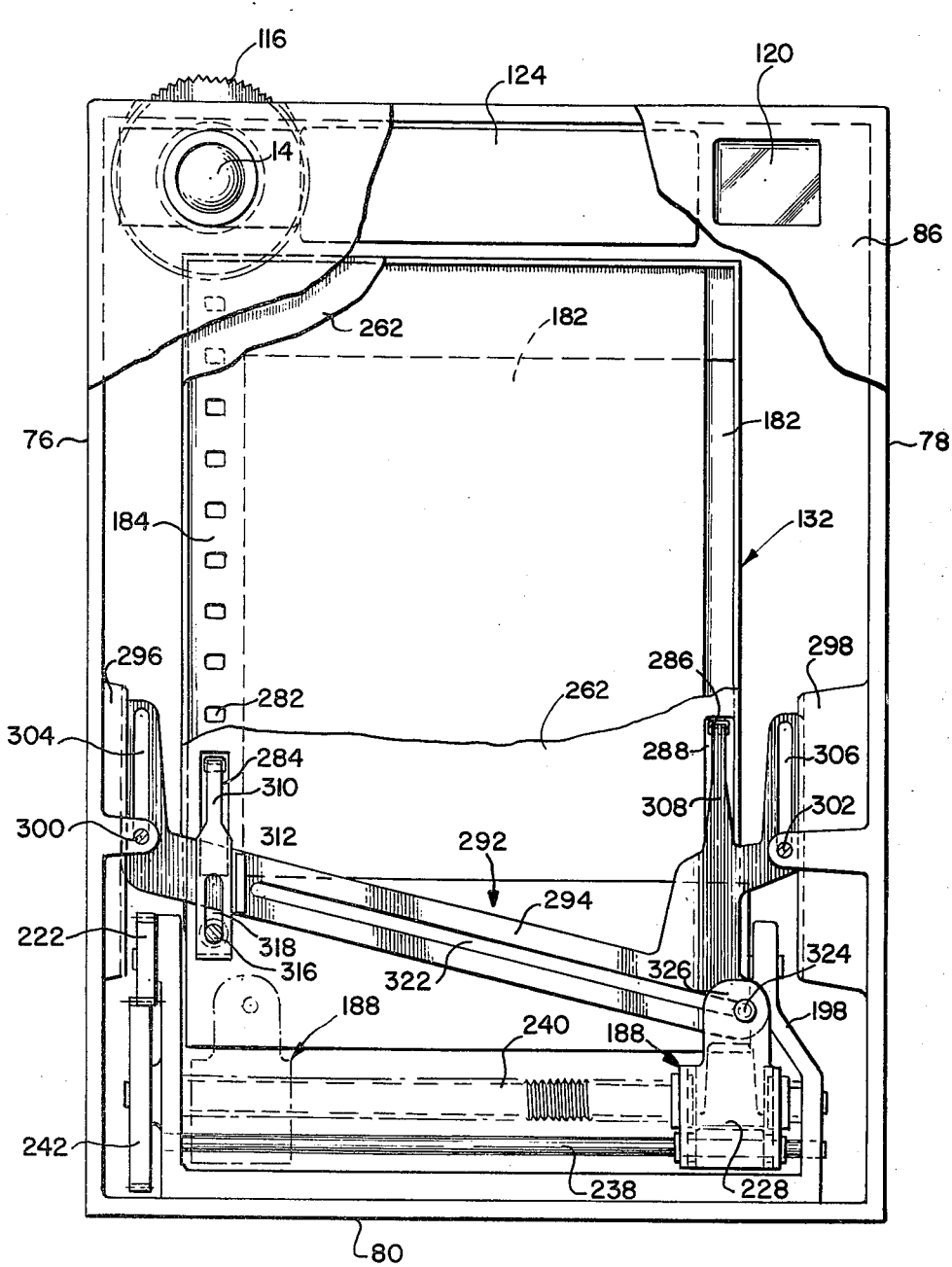
FIG. 11 is a front sectional view of the camera of FIG. 10 showing the details of an image receiving sheet and transfer sheet advancing mechanism.

As best shown in FIGS. 11, 12 and 13, the printing head assembly 188 comprises a carriage member 224 defined by a pair of vertically disposed spaced side walls 226 and a connecting rear wall 228 which extends above side walls 226 and a generally L-shaped print head 230 disposed between side walls 226 and including a short leg 232 which mounts printing transducers 190, 192 and 194 and a longer leg 234 which extends out of the lower portion of housing section 68 through an elongated slot or opening 236 provided in rear wall section 84 and serves as an actuating lever or handle to facilitate the manual manipulation of assembly 188.

The carriage member 224 and the L-shaped print head 230 are mounted on a horizontal rod or guide pin 238 which extends between the opposed upright arms of support frame 198 below drum 186 for sliding movement between the end of print terminal position (shown in solid lines in FIGS. 11 and 13) adjacent one end of drum 186 and an initiate print terminal position (shown in phantom lines in FIGS. 11 and 13) adjacent the opposite end of drum 186.

As will become apparent later, assembly 188 is configured to be manually moved along pin 238 from the end of print position to the initiate print position and thereafter to be driven from the initiate print position to the end of print position during the printout cycle.

The means for driving assembly 188 includes a finely threaded horizontally disposed lead screw 240 rotatably mounted in the upright portions of support frame 198 over pin 238. As best shown in FIG. 13, the right hand end of lead screw 240 extends beyond the right-hand upright of frame 198 and has a gear 242 fixedly secured thereto that is in mesh with the power take off gear 222 on the motor driven output shaft 216 of the speed reducer 214.

The lead screw 240 passes through opposed oversized openings in the side walls 226 of carriage 224 and is normally engaged by a half nut portion 244 of print head 230 which is formed with a complementary screw thread on the interior thereof and is adapted to mesh in driving engagement with the thread of lead screw 240.

In FIG. 12 the print head 230 is shown in its normal operating position in solid lines wherein the half nut portion 244 thereof is located in driving mesh with lead screw 240 and in its inoperative position in phantom lines wherein it is disengaged from lead screw 240 to permit manual sliding movement of assembly 188 along the guide pin 238.

To hold the half nut portion 244 of print head 230 in meshed engagement with lead screw 240, the print head 230 is biased by a torsion spring 246 having one end coupled to print head 230 and its opposite end coupled to side wall 226 of carriage 244 such that print head 230 pivots in a clockwise direction (as viewed in FIG. 12) about guide pin 238 causing the threads of half nut portion 244 to press against the threads of lead screw 240. When so located in this operative position, the printing transducers 190, 192, 194 on print head 230 are located in close proximity to the surface of drum 186 in position to engage a portion of transfer sheet 184 located against an image receiving sheet 182 on drum 186 and the handle or lever portion 234 of print head 230 is horizontally oriented.

To disengage the print head 230 from lead screw 240, the handle 234 is manually moved upwardly causing the print head 230 to pivot in a counterclockwise manner about pin 238 against the bias of spring 246 thereby pivoting the half nut portion 244 out of engagement with lead screw 244 and spacing the printing transducers 190, 192 and 194 a substantial distance from the surface of drum 186. When print head 230 is so disengaged, the print head assembly 188 may be manually moved by sliding it along pin 238 with the raised handle 234 of print head 230.

As will be described later, the motion of the print head assembly 188 as it is manually moved from the end of print position to the initiate print position is used to operate a mechanism for advancing an image receiving sheet 182 from the cassette 132 into operative relation with drum 186 and also incrementally advancing the transfer sheet 184 relative to the printing transducers 190, 192 and 194 on print head 230.

As noted earlier, the color print of the recorded image is formed on the image receiving sheet 182 by effecting the selective transfer of cyan, magenta, and yellow printing mediums from the transfer sheet 184 to the image receiving sheet 182 on drum 186.

The means for effecting the selective transfer of the secondary color printing mediums are the three printing transducers 190, 192 and 194, to be described in detail later, which are modulated or driven by three secondary color image signals, derived from the primary color image signals fed to printer 28, and convert the secondary color image signals into printing signals in a form of energy such as pressure which when applied to the transfer sheet 184 effects the selective transfer of the secondary color printing mediums therefrom to image receiving sheet 182 thereby printing three superimposed dot patterns on the image receiving sheet 182 that define the recorded image in much the same manner as images printed on a receiving sheet by a subtractive color halftone printing process.

The transfer sheet 184, as best shown in FIGS. 14 and 15, include an elongated base sheet 248 preferably formed of a plastic material such as Mylar having a plurality of secondary color bands or stripes thereon arranged in repeating sets of three sequential bands or stripes 250, 252 and 254 comprising respectively cyan, magenta and yellow inks or dyes releasably adhered to the base sheet 248 by a binding agent such as wax or the like. Overlying the color bands on the opposite side thereof from base sheet 248 is a very thin coating or layer 256 of a polymerized plastic material having a low coefficient of friction.

As will become apparent, the transfer sheet 184 is adapted to be located in operative relation with printer 28 such that one set of the three color bands 250, 252 and 254 is located between an image receiving sheet 182 on drum 186 and the printing transducers 190, 192 and 194, with the layer 256 facing sheet 182 and the transducers 190, 192 and 194 in engagement with the base sheet 248 in alignment respectively with the bands 250, 252 and 254 which extend along the drum 184 in the linear paths of travel of the transducers 190, 192 and 194.

When so located, the layer 256 of sheet 184 contacts the image receiving sheet 182 and the low friction properties of layer 256 allows the sheet 182 to slide thereunder freely in response to rotation of drum 186. Layer 256 also inhibits the transfer of inks in the color bands 250, 252 and 254 until an appropriate printing signals are applied to transfer sheet 184 by the printing transducers 190, 192 and 194.

As noted earlier, the image receiving sheets 182 comprise a high quality grade printing paper that is receptive to the cyan, magenta and yellow inks or dyes of transfer sheet 184.

In a preferred embodiment, a stack of image receiving sheets 182 (for example ten (10)) and a single transfer sheet 184 having at least ten (10) sets of color bands 250, 252 and 254 are provided in the cassette 132 which is adapted to be located in the cassette receiving chamber 130 of camera 10.

As best shown in FIGS. 7, 12 and 16, cassette 132 comprises a substantially thin, planar upper box-like section 258 for holding a stack of image receiving sheets 812 and a portion of transfer sheet 184 and a lower depending curved section 260 which supports a portion of transfer sheet 184 extending out of upper section 256 and serves as a guide for guiding and locating the transfer sheet 184 in operative relation with the printing transducers 190, 192 and 194.

The upper and lower sections 258 and 260 share a common wall 262 which curves at lower section 260 to conform to the shape of drum 186. Upper section 258 is defined by the upper portion of wall 262, an opposed wall 264 and a peripheral section comprising a top wall 266, a pair of side walls 268 and a bottom wall 270 having an elongated withdrawal slot 272 therein adjacent wall 262. It will be noted that cassette 132 includes an indented transition surface 274 at the intersection of walls 264 and 270 which serves as a locating bearing surface that cooperates with an L-shaped flange 276 in receiving chamber 130 to accurately located cassette 132 therein.

The lower section 260 of cassette 132 includes a pair of integrally formed guide channels 278 along the lateral edges of wall 262 for receiving the lateral edges of transfer sheet 184. It will be noted that the channel structure extends beyond the lower edge of wall 262 as indicated at 280 such that one set of three color bands 250, 252 and 254 on transfer sheet 184 may be located in the extended portions 280 thereby clearing the lower edge of wall 262.

The elongated transfer sheet 184 is initially located against wall 262 of cassette 132 with its base sheet 248 facing wall 262. It extends from the interior of the upper section 258 through withdrawal slot 272 and along the curved portion 260 of wall 262 with its lateral edges in guide channels 278.

As shown in FIG. 14, transfer sheet 184 has a plurality of sprocket holes 282 along one lateral edge thereof which are aligned with an opening 284 in cassette wall 262 which provides access for a later-to-be-described advancing mechanism to engage the holes 282 for the purpose of advancing the transfer sheet 184 relative to cassette 132 and the printing transducers 190, 192, and 194.

The stack of image-receiving sheets 182 is located within the upper section 258 of cassette 132 in overlying relation to the portion of transfer sheet 184 therein with the forwardmost sheet 182 in the stack closest to sheet 184 being in alignment with the withdrawal slot 272.

Each of the sheets 182 has a single sprocket hole 286 in one lateral edge thereof which is aligned with an access opening 288 in wall 262 of cassette 132 that provides access for the later-to-be-described advancing mechanism to an engage hole 286 for the purpose of advancing the forwardmost sheet 182 through withdrawal slot 272 and into operative engagement with drum 186. A spring platen 289 is provided in cassette 132 to urge the stack of image-receiving sheets 182 toward wall 262.

As best shown in FIG. 11, the stack of sheets 182 is offset laterally with respect to transfer sheet 184 such that the lateral edge having the sprocket hole 286 extends beyond the lateral edge of transfer sheet 184 thereby providing clearance for the advancing mechanism to engage sheet 182 through the access opening 288 without engaging transfer sheet 184.

Access for loading cassette 132 into the receiving chamber 130 is provided by pivoting the housing section 72 mounting the display device 24 and the flat battery 134 to its open position.

Before loading cassette 132, the printing head 230 is manually pivoted to its inoperative position to displace the printing transducers 190, 192 and 194 from drum 186. The cassette 132 is inclined with respect to chamber 132 and its lower curved section 260 is inserted first over the top of the drum 186. The cassette is pivoted in a counterclockwise manner (as viewed in FIG. 12) so that the curved portion 260 follows the contour of the drum 186 to locate the extended portions 280 of guide channels 278 in a position wherein the three color bands 250, 252 and 254 of transfer sheet 184 extending therebetween will be aligned with trausducers 190, 192 and 194 when print head 230 is returned to its operative position. In response to the pivotal motion of the cassette 132, the upper portion 258 thereof is located at its operative position in chamber 130. As shown in FIG. 12, the upper portion of cassette wall 262 bears against a vertically disposed locating plate 290 in the upper portion of housing section 68 and the indented transition section 274 of cassette 132 rests against the conforming locating bracket 276. The cassette 132 is further supported in chamber 130 by portions of the battery-receiving channels 180 which bear against the wall 264 of cassette 132 when housing section 72 is located in its closed position. Once cassette 132 is located in its operative position in chamber 230, the print head 130 is pivoted back to its operative position.

The means for advancing an image-receiving sheet 182 into operative relation with drum 186 and incrementally advancing the transfer sheet 184 to present a fresh set of color bands 250, 252 and 254 in alignment with printing transducers 190, 192 and 194 for each printout includes a pick mechanism 292 which is operable in response to manually moving the printing head assembly 188 from the end of print position shown in solid lines in FIG. 11 to the initiated print position shown in phantom lines.

The pick mechanism 292 inclues an elongated slide member 294 having its opposite lateral side portions slidably captured in vertically disposed guide channels 296 and 298 on the interior of side walls 76 and 78 of housing section 68. The vertical sliding motion of slide member 294 is limited by fixed stop pins 300 and 302 which extend through elongated vertical slots 304 and 306 in member 294 adjacent guide channels 296 and 298.

Integrally formed with slide member 294 is a first pick arm 308 having a hook-like upper end that is adapted to extend through access opening 288 in cassette wall 262 and into the sprocket hole 286 in the forwardmost image-receiving sheet 182 in the stack thereby engaging the forwardmost sheet 182 for advancement through withdrawal slot 272 toward drum 186 in response to downward movement of slide member 194.

A second pick arm 310 is mounted on slide member 294 and includes a hook-like upper end that is adapted to extend through access opening 284 in cassette wall 262 and into one of the sprocket holes 282 in transfer sheet 184 thereby engaging sheet 184 for advancement through withdrawal slot 272 and relative to the printing transducers 190, 192 and 194 to present a new set of the three color bands 250, 252 and 254 in alignment with the transducers in response to downward movement of slide member 294.

The distance that the forwardmost image-receiving sheet 182 must be moved to engage it with drum 186 exceeds the incremental distance transfer sheet 184 must be moved to advance it one set of color bands. Therefore, the pick arm 310 is mounted on slide member 294 in a manner which provides for an appropriate amount of lost motion.

As best shown in FIGS. 11 and 12, pick arm 310 is mounted in a pair of guide channels 312 on member 294 for vertical sliding motion relative thereto. Arm 310 terminates in a horizontal flange 314 at its lower end that extends rearwardly under the lower edge of slide member 294. Flange 314 is spaced a predetermined distance below member 294 by means of a guide pin 316 on wall section 82 of housing section 68 that extends through a vertical slot 318 in arm 310 and a spring 320, having one end attached to arm 310; and its opposite end attached to a lug on plate 136 of device 26, which provides an upward biasing force on arm 310 to hold the lower end of slot 318 against pin 316.

As best shown in FIG. 11, the slide member 294 also has an inclined elongated slot 322 therein for slidably receiving a drive pin 324 fixedly mounted on a pin support extension 326 of wall 228 of printing head carriage 224 that forms part of print head assembly 188. It is readily apparent that as assembly 188 is moved from its end-of-print position to its initiate print position (to the left as viewed in FIG. 11) the horizontal movement of pin 324 riding in slot 322 will drive the slide member 294 downwardly from the position shown in FIG. 11, and that movement of pin 324 in the opposite direction in response to the lead screw 240 driving assembly 188 from the initiated print position to the end of print position will cause slide member 294 to be driven upwardly.

Assume now that the pick mechanism 292 is in its fully raised position shown in FIGS. 11 and 12 with the print head assembly 188 located in the end of print position (to the right as viewed in FIG. 11). To initiate a printout cycle of operation, the camera operator manually raises the handle portion 234 of print head 230 which causes the print head 230 to pivot thereby disengaging the half nut portion 244 from lead screw 240 and spacing the transducers 190, 192, and 194 from drum 186. As best shown in FIG. 12 when print head 230 is pivoted to its disengaged position, it engages and closes a normally open switch 38 mounted on carriage 224 thereby actuating circuit 54 which operates the magnetic record and playback device 26 causing it to rewind the magnetic tape one frame.

As the operator manually moves print head assembly 188 to the left as viewed in FIG. 11, the pin 324 in slot 322 drives the slide member 294 and the integral pick arm 308 thereon downwardly and arm 308 advances the forwardmost image-receiving sheet 182 through slot 272 toward drum 186.

During the initial downward movement of slide member 294, the second pick arm 310 remains stationary because it is held in its up position by the biasing force of spring 320. Pick arm 310 remains in this position until the lower edge of slide member 294 engages the horizontal flange 314 at the lower end of arm 310 at which point member 294 begins to drive arm 310 downwardly therewith overcoming the bias of spring 320. As member 294 is further advanced downwardly, pick arm 308 advances sheet 182 towards drum 186 while arm 310 simultaneously advances the transfer sheet 184 relative to the operative position of transducers 190, 192 and 194. As noted earlier, the transfer sheet 184 is adapted to be advanced a shorter distance than the image-receiving sheet 182 and this is accomplished by the lost motion characteristics of pick mechanism 294 which delays initiating movement of pick arm 310 until pick arm 308 has moved through a predetermined distance.

As best shown in FIG. 12, the drum 196 has an elongated slot 328 formed along its length for receiving the leading end of image-receiving sheet 182 (shown in dotted lines) and a spring retaining clip 330 for releasably retaining the leading end in slot 328. As pick mechanism 292 approaches the end of its downward travel arm 308 advances image-receiving sheet 182 into slot 328 such that its leading end is captured in spring retaining clip 330. At this point, pick arm 310 has advanced the transfer sheet 184 one set of color bands 250, 252 and 254 relative to the operative position of transducers 190, 192 and 194 on print head 230. Although not shown in the drawings ramp-like cam members are provided in the path of travel of pick arms 308 and 310 such that they are cammed slightly away from cassette 132 at the end of the downward movement of pick mechanism 294 thereby disengaging the hook-like ends of arms 308 and 310 from the respective sprocket holes in image-receiving sheet 182 and transfer sheet 184.

As best shown in FIG. 13, the button switch 40 is located on the horizontal portion of support frame 198 near the right-hand end of drum 186. When the print head assembly 188 is located in the initiate print position (the right-hand terminal position as viewed in FIG. 13), the operator begins the actual printout phase by lowering the handle portion 234 of print head 230 which engages and closes the normally open switch 40 when the print head 230 is in its operative position.

As noted earlier, the closing of switch 40 energizes and actuates the READ ONE FRAME circuit 50, which operates the tape record and playback device 26 in a playback mode to feed the electronic image signals to printer 28, and the ACTUATE PRINTER circuit 58 which operates printer 28.

The motor 196 is energized with a voltage having the appropriate polarity such that the drum 186 is rotated in a counterclockwise direction (as viewed in FIG. 12) and the lead screw 240 is rotated in the appropriate direction to cause the print head assembly 188 to be driven from the initiated print position in phantom lines to the end of print position shown in solid lines in FIGS. 11 and 13.

During the course of the initial revolution of drum 186 the forwardmost image-receiving sheet 182 having its leading end captured in slot 328 by clip 330 is pulled through slots 272 of cassette 132 and is wrapped on the surface of drum 186. As drum 186 rotates, the print head assembly 188 is driven along lead screw 240 and the printing transducers 190, 192 and 194, in engagement with the colorbands 250, 252 and 254 of the transfer sheet 184, are selectively energized by the secondary color image signals to effect the selective transfer of the secondary color print mediums from sheet 184 to sheet 182 to print out the recorded image.

As assembly 188 is driven along lead screw 240, the pick mechanism 292 is driven upwardly by pin 324 riding along slot 322.

When the print head assembly 188 reaches the end of print position, the left side wall 226 of carriage 224 engages and closes the normally open switch 42 mounted on the left hand upright of frame 198 (as viewed in FIG. 13). As noted earlier, the closing of switch 42 actuates the EJECT PRINT circuit 60 which is effective to brake the rotation of motor 196 thereby stopping the rotation of drum 186 and thereafter apply a reverse polarity voltage to motor 196 causing it to run for a short time in reverse such that drum 186 revolves through a single clockwise revolution. During the course of this single revolution, the trailing or free end of the image-receiving sheet 182 on drum 186 is lifted therefrom by a wedge-shaped stripper bar 332 (see FIG. 12) extending inwardly toward drum 186 from the top edge of rear wall section 84 of housing section 68 thereby feeding the trailing end of sheet 182 through a print exit slot 334 defined by bar 332 and the bottom wall portion 178 of housing section 72 on the rear side of camera housing 12. In response to this single reverse revolution of drum 186 at least a portion of the image-receiving sheet 182 is advanced to the exterior of camera 10 through exit slot 334 where it may be grasped by the operator and manually pulled to release its leading end from retaining clip 330.

For each successive print, the transfer sheet 184 is advanced to provide a fresh set of the three secondary color bands 250, 252 and 254 in alignment with the printing transducers 190, 192 and 194, and the used portion of sheet 184 accumulates in a receptacle (not shown) in the hollow space between the bottom of drum 186 and the rear wall section 84 of housing section 68. A small door (not shown) may be provided in rear wall section 84 which provides access to the receptacle for removing the transfer sheet 184.

During the course of the printout cycle the magnetic tape record and playback device 26 feeds the primary color red, green and blue electronic image signals representing the recorded image from the magnetic tape to printer 28. Because the printer 28 is designed to operate in a subtractive color mode using the secondary colors, cyan, magenta and yellow, the primary color image signals must be converted to equivalent secondary color image signals which are then applied to the printing transducers 190, 192 and 194.

For example, printer 28 is operative to reproduce the color red by laying down superimposed magenta and yellow dots. Therefore, a red input signal must be converted to equivalent magenta and yellow signals. Likewise, the color green is rendered by superimposed cyan and yellow dots and blue is rendered by superimposed magenta and cyan dots.

For any given set of the three primary color electronic image signals that represent a particular color in the additive color mode, there is an equivalent set of the secondary color image signals that represent the same color in the subtractive color mode. The relation of the primary signals to the secondary signals may be described mathematically by a set of simultaneous transformation equations that balance the color characteristics of the red, green and blue color filters of color separator 15 with the color characteristics of the cyan, magenta, and yellow inks or dyes used in the transfer sheet 184. Once the relationship between thee two color systems is defined by the set of simultaneous transformation equations the conversion may be done electronically by means of a matrixing circuit.

As best shown in FIG. 17, the printer 28 includes means for converting the additive primary color red, green, and blue image signals to corresponding subtractive secondary color cyan, magenta and yellow image signals in the form of an electronic matrixing circuit 336 designated ADDITIVE TO SUBTRACTIVE SIGNAL CONVERTER circuit 336. The three primary color electronic image signals from the magnetic record and playback device 26 are fed into circuit 336 which converts these signals into equivalent secondary color image signals that are fed to the printing transducers 190, 192 and 194. Because the printing transducers 190, 192 and 194 are spaced relative to one another on print head 230, it is necessary to adjust the phase relationship of the secondary color image signals such that the three transducers may operate to superimpose three color dots defining a single picture element at one location on the image receiving sheet. In a preferred embodiment circuit 336 also includes such means for adjusting the phase relationship of the secondary color image signals in accordance with the physical spacing of the printing transducers 190, 192 and 194 and the diameter and operating speed of rotation of drum 186.

During each revolution of the drum 186 the printing transducers 190, 192, 194 print out a single line of image information in the form of overlying secondary color dots and the screw thread 240 advances the print head assembly 188 in synchronization with the rotation of drum 186 to index the printing transducers 190, 192 and 194 one line position for each revolution of drum 186 so that the entire image receiving area of sheet 182 is scanned in response to advancing assembly 188 from the initiate print position to the end of print position.

As noted earlier the printing transducers 190, 192 and 194 preferably convert an electronic image signal applied thereto to a printing signal in the form of pressure which acts on the transfer sheet 184 and is effective to cause the transfer of the printing medium from transfer sheet 184 to the image receiving sheet 182 on drum 186.

One type of printing transducer which provices a pressure output in response to an electronic signal input is shown in FIG. 18 of the drawings.

The printing transducer designated 190 in FIG. 18 (transducers 192 and 194 being identical to transducer 190) is of the electromagnetic type and includes a diamond pointed stylus 337 that is adapted to engage the base layer 248 of the transfer sheet 184 and apply pressure therethrough to the ink or dye in the color band causing it to transfer to the image receiving sheets in much the same manner that ink is transferred from a typewriter ribbon to a receiving sheet upon presure impact of a printhead.

The transducer 190 includes an annular steel collar 338, an annular magnet 340 having one of its pole ends coupled to collar 338, a steel base piece 342 coupled to the opposite pole end of magnet 340, a steel shaft 344 mounted on base piece 342 and extending through magnet 340 and into the open central bore of collar 338 to define an annular gap 346 between shaft 344 and collar 338, and a non-magnetic drive tube 348, having a wire coil 350 wound thereon, slidably mounted for axial movement on shaft 344 in gap 346.

The drive tube 348 extends slightly beyond the end of shaft 344 and it is coupled to the collar 338 by means of a bellow like spring member 352. Mounted in the open bore of tube 348 is a cone-like diaphragm portion of member 354 having the diamond-pointed stylus 337 secured thereto. The stylus 337 extends through the open central bore of a protective transducer end cap 358.

Through magnetic coupling with magnet 340 the collar 338 and shaft 344 are oppositely magnetically polarized thereby establishing a magnetic force field across gap 346. When a secondary color electronic image signal is applied to coil 350 the current flow therethrough interacts with the magnetic field and produces a thrust force, proportional to the signal strength, that is effective to displace the drive tube 348 and the stylus 337 thereon axially in the direction of the end cap 358. When the signal is removed from coil 350 the tube 348 and stylus 337 thereon are restored to the initial position by the bellow-like spring member 352. In this manner, the stylus 337 is driven in an axial direction with a force that is proportional to the strength of the image signal applied to coil 350.

The three printing transducers 190, 192 and 194 are mounted on the short leg 232 of print head 230 such that the diamond point on their respective styluses 337 preferably just engage the base sheet 248 of the cyan, magenta and yellow color bands 250, 252 and 254 on transfer sheet 184 when the print head 230 is located in its operative position (shown in solid lines FIG. 12) with no image signal applied to their respective coils 350. Alternatively the points of styluses 337 may be spaced slightly from the base sheet 248 when there is no signal applied.

In either event when an image signal is applied to the coil 350 of any one of the transducers, its stylus 337 is driven axially toward the drum 186 so as to engage the base sheet 248 of the transfer sheet 184 and apply sufficient pressure therethrough to the printing medium which is displaced from the color band and adheres to the image receiving sheet 182 on drum 186. It will be noted that the plastic layer 256 on transfer sheet 184 is sufficiently thin and ruptures upon the pressure impact provided by stylus 337 so as not to inhibit such displacement of the printing medium and its transfer to sheet 182.

The transfer of the printing medium to sheet 182 creates a color dot thereon. The size of the dot is proportional to the amount of pressure applied to transfer sheet 184 by stylus 337 which in turn is proportional to the strength of the image signal applied to coil 350. Therefore, the dot size is proportional to signal strength. That is, a relatively strong image signal produces a greater amount of pressure than a weaker signal and the size of the dot increases with increasing pressure.

As noted earlier an image is printed out on the receiving sheet 182 in the form of three overlying secondary color dot patterns which are similar in some respects to those produced in color halftone printing processes. The dots are applied with essentially equal spacing between dots. However, the dot size is varied in proportion to image signal strength to provide variations in density or color saturation. That is in the high light areas of the image the equally spaced dots are relatively small and are viewed against the white background of the image receiving sheet 182 so as to appear low in color saturation. On the other hand in shadow areas the equally spaced dots are much larger in size and less of the white background is visible and the apparent color saturation is much higher.

In a preferred embodiment of camera 10, the imaging system and printer 28 have an operating resolution of approximately 200 lines/inch. The image receiving area of image receiving sheet 182 measures approximately 3"×3" and the total printout time approximates one minute with drum 186 being driven at the rate of 600 RPM. The individual color dots have a maximum diameter of approximately 0.008 of an inch.

In use camera 10 is loaded with a magnetic tape cassette 128 and an image receiving sheet and transfer sheet cassette 132. The printing head assembly 188 is located in its end of print terminal position adjacent the left-hand end of drum 186 as viewed in FIGS. 6 and 13.

To electronically record and display an image of a scene, the operator views and frames the scene through the viewfinder formed by lenses 120 and 122, focuses the objective lens 14 with focusing wheel 116 and actuates the button switch 32 on said wall 76 of housing section 68.

Upon actuation of switch 32 the CLEAR THEN READ CCD 16 circuit 44 clears the photosensitive tranducer CCD16 of ambient light signals. The optical image of the scene provided by lens 14 is separated by color separator 15 into its red, green and blue primary color components which are focused on CCD16. The photosensitive elements of CCD16 are charged in proportion to the image bearing light intensity thereby converting the optical image into red, green and blue electronic image signals that represent the image in electronic data form. In response to appropriate control signals applied to CCD16 by circuit 44, these electronic image signals are read out of CCD16 and are transferred to memory 20 through A→D converter 18. The image signals are read out of memory 20 on a repeating basis at approximately a video rate under the control of the READ MEMORY circuit 48 and DELAY circuit 54 and the signals are fed to the display device 24 through D→A converter 22 for display, the display device being actuated by ACTUATE DISPLAY SCREEN circuit 50. During the course of the image display the RECORD ONE FRAME dircuit 52 provides appropriate control signals to magnetic tape record and playback device 26 which operates in a record mode at the relative fast video rate and device 26 records on magnetic tape one full frame of the electronic image signals provided to device 26 from memory 20 through D→A converter 22. The image is continuously displayed on display device 24 as long as the operator presses button switch 32. When he releases switch 32, the electronic image signals are automatically deleted from memory 20. The electronic image signals representing the image are retained on the magnetic tape for subsequent printout and/or display.

To print out the recorded image, the operator manually resets the printer 28 by moving the printing head assembly 188 from its end of print terminal position to the initiate print terminal position adjacent the right-hand end of drum 186 as viewed in FIGS. 6 and 13. The handle portion 234 of print head 230 is raised to pivot the half-nut portion 244 of print head 230 out of engagement with the lead screw 240 thereby locating print head 230 in its inoperative position. As print head 230 approaches its inoperative position it engages and actuates or closes the normally open switch 38 which actuates the REWIND ONE FRAME circuit 54. Circuit 54 provides appropriate control signals to the tape record and playback device 26 thereby operating it in a rewind mode during which the magnetic tape is rewound one frame at the relatively fast rate to the beginning of the last recorded image thereon.

Once print head 230 is disengaged from lead screw 240, the operator manually moves the print head assembly 188 to the initiate print position by sliding assembly 188 along the guide pin 238 thereby operating the pick mechanism 292 which advances an image receiving sheet through the withdrawal slot 270 of cassette 132 and into operative relation with drum 186 whereby the leading end of sheet 182 enters the slot 328 in drum 186 where it is releasably retained by clip 330 and the transfer sheet 184 is advanced to locate a fresh set of color bands 250, 252 and 254 in operative relation with the operative position of the printing transducers 190, 192 and 194.

With assembly 188 in its initiate print terminal position the print head 230 is pivoted back to its operative position to engage the half-nut portion 244 with lead screw 240 and locate the printing transducers 190, 192 and 194 in their operative position adjacent the surface of drum 186. As print head 230 approaches its operative position it engages and closes the normally open switch 40 to actuate the READ ONE FRAME circuit 56 and the ACTUATE PRINTER circuit 58.

Circuit 56 provides the appropriate control signals to record and playback device 26 to operate it in the playback mode at the relatively slow rate. Device 26 feeds the primary color electronic image signals from the magnetic tape to the ADDITIVE TO SUBTRACTIVE SIGNAL CONVERTER circuit 336 of printer 28 which converts the three primary color image signals to three corresponding subtractive color signals which are adjusted in phase relation to compensate for the spacing of the printing transducers and are fed to the printing transducers 190, 192 and 194.

The ACTUATE PRINTER circuit 58 provides appropriate control signals to printer 28 to operate circuit 336 and energize drive motor 196. Upon energization the motor 196 drives the drum 186 and the lead screw 240. During the initial revolution of drum 186 the image receiving sheet 182 having its leading end releasably retained in drum slot 328 by clip 330 is pulled from cassette 132 and is wrapped on drum 186. As drum 186 rotates the lead screw 240 drives the print head assembly 188 in synchronization along its linear axial path of travel. The secondary color image signals from circuit 336 are applied to the printing transducers 190, 192 and 194 which convert the electronic image signals into corresponding print signals in the form of pressure which transducers 190, 192 and 194 apply to the color bands 250, 252 and 254 of transfer sheet 184 to effect the selective transfer of cyan, magenta and yellow print mediums therefrom to the image receiving sheet 182 on drum 186 thereby printint out three overlying secondary color dot patterns on sheet 182 which form a color print of the recorded image.

As the lead screw 240 drives the print head assembly 188 from the initiate print position to the end of print position the pin 324 on carriage 224 riding in slot 322 of the pick slide member 294 is operative to reset the pick mechanism 292.

As the print head assembly 188 reaches its end of print position, the carriage 224 engages and closes the normally open switch 42. The closing of switch 42 actuates the EJECT PRINT circuit 60 which provides appropriate control signals to motor 196 thereby braking the rotation of drum 186 and thereafter applies a reverse polarity voltage to motor 196 which reverses the direction of rotation and drum 186 through one reverse revolution to partially eject the image receiving sheet 182 on drum 186 out of the camera housing 12 through the exit slot 334.

Should the operator wish to review the images recorded on the magnetic tape, he presses the button switch 34 on wall 76 of camera housing section 68. The closing of this normally open switch 34 actuates the COMPLETELY REWIND TAPE circuit 62 which provides appropriate control signals to tape record and playback device 26 to operate it in a rewind mode at the relatively fast rate to completely rewind the magnetic tape.

Once the magnetic tape is rewound, the operator may display the recorded images from the tape on display device 24 in sequence by repeated actuations of button switch 36 on side wall 70 of housing section 68.

In response to each actuation of switch 36, the READ ONE FRAME circuit 64 is actuated which provides appropriate control signals to record and playback device 26 to operate it in a playback mode at the relatively fast rate whereby one frame of electronic image signals from the tape are fed to memory 20 through A→D converter 18 and then to display device 24 from memory 20 on a recirculating basis through D→A converter 22 for display. The image is displayed on device 24 as long as the operator maintains switch 36 in its closed position. Upon releasing switch 36, the image signals are automatically deleted from memory 20.

If at any time during the review of the recorded images the operator wishes to print out a hard copy, he may initiate the printout cycle by manually moving the print head assembly 188 from its end of print position to its initiate print position as explained earlier.

While the illustrated embodiment of camera 10 is configured to provide a full color print of the recorded image, it will be obvious to those skilled in the art that a less complex version of such a camera based on the inventive concepts described herein may be configured to provide a black and white print. Also, those skilled in the art will recognize that the control logic system 30 illustrates but one arrangement of circuits for providing the desired control functions and that there are many variations thereof which may be employed without departing from the scope of the present invention.

Since certain other changes also may be made in the above-described self-processing electronic imaging camera without departing from the scope of the invention herein involved, it is intended that all matter contained in the above description or shown in the accompanying drawings shall be interpreted as illustrative and not in a limiting sense.

I claim:

1. A hand held camera of a size and weight suitable to be held in the hand of an operator, said camera comprising:
    a camera housing having a first and a second section;
    a substantially planar electrically energizable electro-optical display device forming in part one wall of said first section;
    means within one of said sections for receiving a battery;
    means located within said first section in communicating relation with said second section for replaceably receiving at least one sheet of an image receiving material;
    optical means, carried by said first section, for viewing, by an operator, a scene to be recorded and for focusing an image of the scene at a given plane, said optical means including an objective lens facing outwardly from a forward wall of said first section;
    an electrically energizable photosensitive transducer, positioned within said first section at said given plane so as to have the optical image of the scene focused thereon by said objective lens, for converting the optical image into electronic image signals that represent the optical image in electronic data form;
    electrically energizable means within said first section for receiving the electronic image signals representative of the optical image of the scene from said transducer and for storing the same;
    an electrically energizable printer, within said second section, with which the sheet of image receiving material is adapted to be operatively associated and being responsive to the electronic image signals representative of the optical image of the scene applied thereto from said signal receiving and storing means for printing an image of the scene on the sheet of image receiving material; and
    control means within said first section and including at least one manually actuatable actuator accessible from the exterior of said first section for coupling components of said camera to the battery to electrically energize said photosensitive transducer, said signal receiving and storing means and said electro-optical display device such that electronic image signals representative of the optical image of the scene are provided by said transducer to said signal receiving and storing means and are applied from said signal receiving and storing means to said electro-optical display device to provide thereon a visual display of the image viewable by the operator, said control means thereafter being selectively operable by the operator for electrically energizing the printer and applying the electronic image signals from said signal receiving and storing means to said printer to effect the printing of an image of the scene on the sheet of image receiving material by said printer.

2. The camera of claim 1 wherein said signal receiving and storing means is a planar structure; said battery is a planar battery; said display device is located in a rear wall of said housing; and said signal receiving and storing means, said image receiving material receiving means and said battery receiving means are arranged in said first housing section between said forward wall and said display device in substantially parallel relation.

3. A hand held camera comprising:

a camera housing having an upper section and a lower section, said upper section including oppositely spaced generally planar forward and rear walls, said rear wall being formed in part by a thin substantially planar electrically energizable electro-optical display device;

means within said upper section for receiving a source of electrical power;

means located within said upper section in communicating relation with said lower section for replaceably receiving at least one sheet of an image receiving material;

optical means, mounted on said upper section, for viewing, by an operator, a scene to be recorded and for focusing an image of the scene, said optical means including an objective lens facing outwardly from said forward wall;

an electrically energizable photosensitive transducer, positioned within said upper section to have an optical image of the scene focused thereon by said objective lens, for converting the optical image into electronic image signals that represent the optical image in electronic data form;

electrically energizable means within said upper section for receiving the electronic image signals representative of the optical image of the scene from said transducer and for storing the same;

an electrically energizable printer, within said lower section, with which the sheet of image receiving material is adapted to be operatively associated and being responsive to the electronic image signals representative of the optical image of the scene applied thereto from said signal receiving and storing means for printing an image of the scene on the sheet of image receiving material;

control means within said upper section and including at least one manually actuable actuator accessible from the exterior of said upper section for coupling components of said camera to the source of electrical power to electrically energize said photosensitive transducer, said signal receiving and storing means and said electro-optical display device such that electronic image signals representative of the optical image of the scene are provided by said transducer to said signal receiving and storing means and are applied from said signal receiving and storing means to said electro-optical display device to provide thereon a visual display of the image viewable by the operator, said control means thereafter being selectively operable by the operator for electrically energizing the printer and applying the electronic image signals from said signal receiving and storing means to said printer to effect the printing of an image of the scene on the sheet of image receiving material by said printer; and said signal receiving and storing means, said image receiving material receiving means and said power source receiving means being arranged in said upper housing section between said forward wall and said display device in substantially parallel relation.

4. The camera of claim 3 wherein said housing includes means for defining an image receiving sheet exit slot therein adjacent said printer and said image receiving material receiving means includes means for receiving a plurality of image receiving sheets arranged in stacked relation and said printer includes means for sequentially advancing individual ones of the image receiving sheets from an initial position in the stack to a position wherein at least a portion extends through said image receiving sheet exit slot in said housing, said printer serving to print an image of a scene on each image receiving sheet so advanced thereby.

5. The camera of claim 3 further including means for separating the optical image of the scene focused by said objective lens into three primary color components, said photosensitive transducer being configured to convert the three primary color components of the optical image into three primary color electronic image signals and said printer being configured to be responsive to the three primary color electronic image signals for printing a full color image represented by the three primary color electronic image signals on the image receiving sheet.

6. The camera of claim 3 wherein said signal receiving and storing means includes a memory being operable such that electronic image signals are applied therefrom to said electro-optical display device on a repeating basis to effect the displaying of the image thereon, and a magnetic recording and playback device, having a magnetic recording medium operatively associated therewith, for recording electronic image signals on said recording medium for storage and for playing back the recorded electronic image signals and applying these signals to said printer to effect the printing of the image on the sheet of image receiving material.

7. The camera of claim 6 wherein said magnetic recording medium includes a magnetic tape housed in a magnetic tape cassette and said camera further includes means for replaceably receiving said magnetic tape cassette to locate said magnetic tape therein in operative association with said magnetic recording and playback device, said control means additionally including means for controlling the operation of said magnetic recording and playyback device whereby electronic image signals representative of optical images of a plurality of scenes may be sequentially recorded on said magnetic tape and thereafter sequentially played back to apply the recorded image signals to said memory which in turn provides these image signals to said electro-optical display device for displaying the images which these signals represent.

8. A camera as defined in claim 1 wherein said image receiving material replaceably receiving means includes means for receiving a cassette including a substantially thin box-like planar portion thereof holding a plurality of image receiving sheets and said means for replaceably receiving a magnetic tape cassette includes means for replaceably receiving a substantially thin planar magnetic tape cassette, and wherein said means for replaceably receiving the cassette of image receiving material and said means for replaceably receiving the magnetic tape cassette are arranged to respectively position the box-like planar portion of the cassette of image receiving material and the magnetic tape cassette in substantially parallel relation to each other and said display screen.

9. A camera as defined in claim 8 wherein said means for replaceably receiving the cassette of image receiving material is arranged to position the box-like planar portion of the cassette intermediate said display screen and the magnetic tape cassette.

10. The camera of claim 8 wherein said means for receiving a source of electrical power includes means for receiving a substantially thin planar battery with the battery positioned in substantially parallel relationship with the box-like portion of the cassette of image receiving material, the magnetic tape cassette and said display screen.

11. The camera of claim 10 wherein said means for replaceably receiving the cassette of image receiving material and said means for replaceably receiving the battery are arranged to position the box-like planar portion of the cassette of image receiving material and the battery intermediate said display screen and the magnetic tape cassette.

12. The camera as defined in claim 8 wherein a major portion of said printer is located below a relative thin peripheral portion of the box-like planar portion of the cassette of image receiving material.

13. The camera of claim 12 wherein said control means includes a substantially flat circuit box disposed within said housing on the opposite side of said box-like planar portion of the cassette of image receiving material from said major portion of said printer with its major surfaces disposed substantially perpendicular to the major surfaces of the box-like planar portion of the cassette of image receiving material.

* * * * *